March 16, 1943.   P. H. WILLIAMS   2,313,982
ACCOUNTING MACHINE
Filed June 4, 1938   7 Sheets-Sheet 1
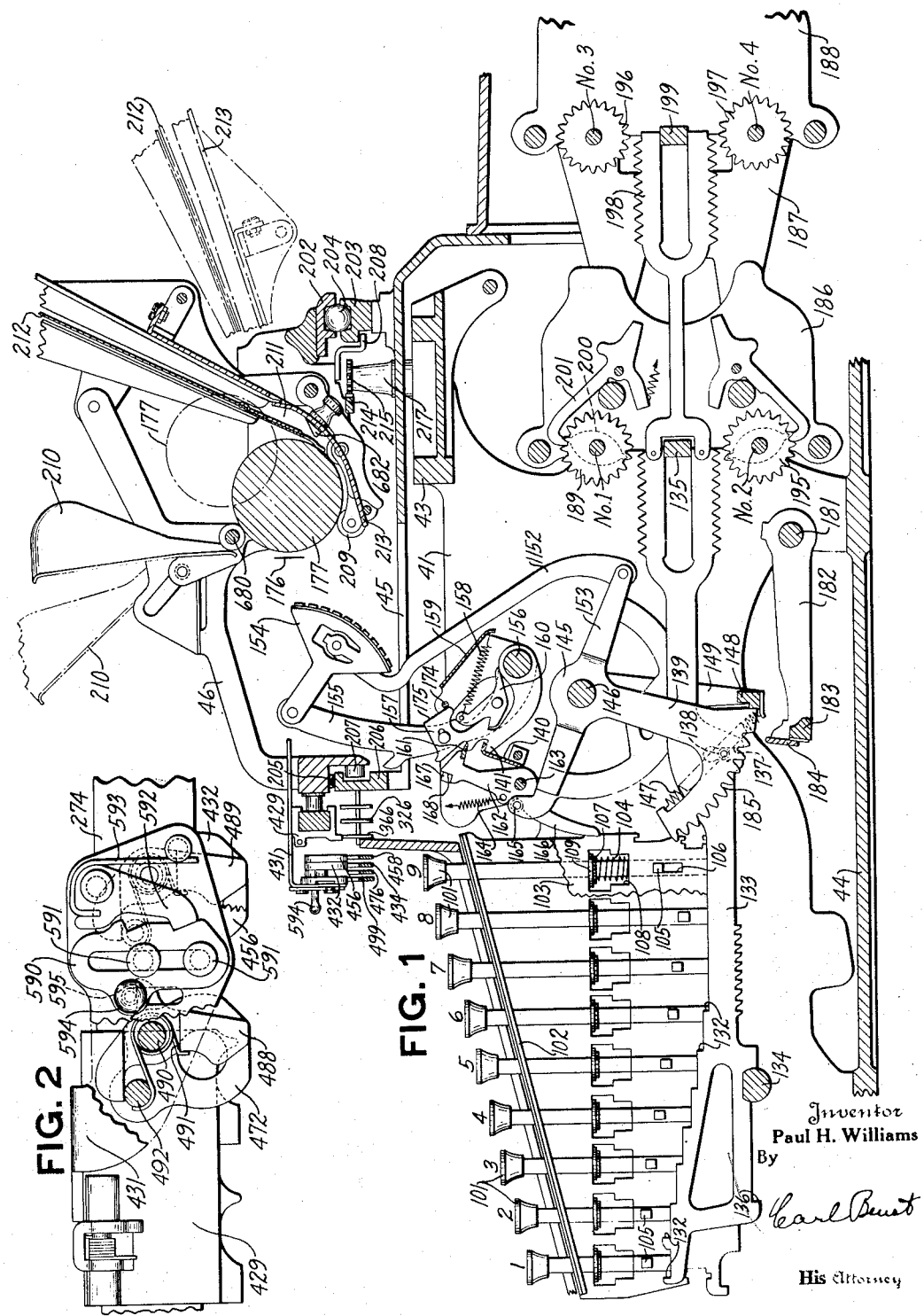
Inventor
Paul H. Williams
By
Carl Benst
His Attorney

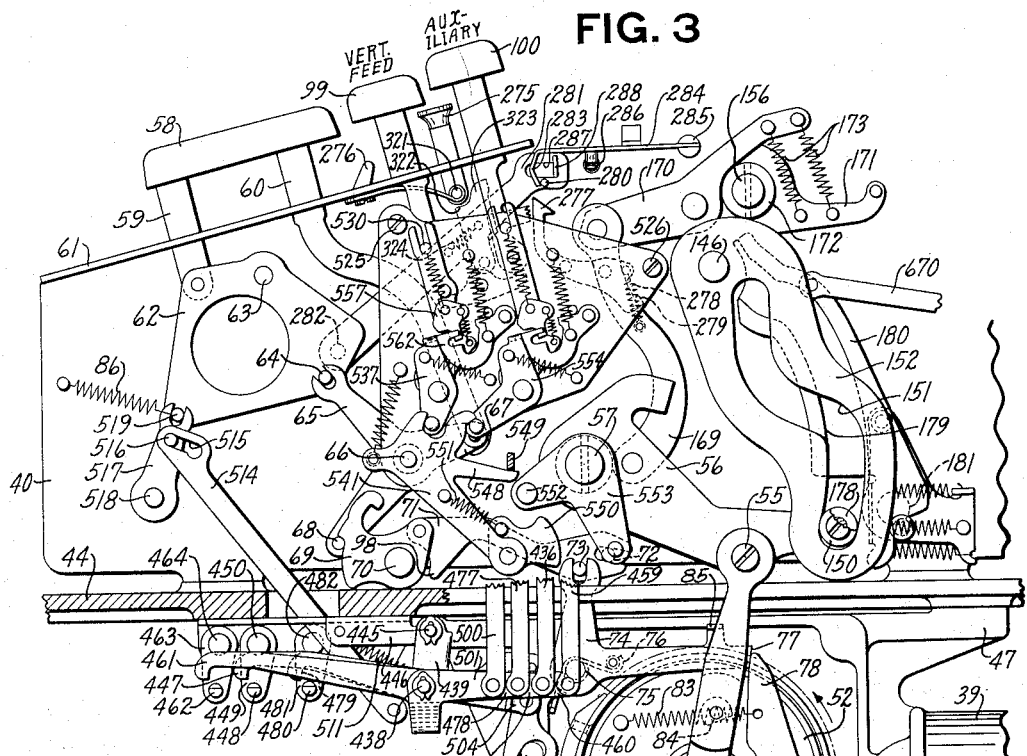

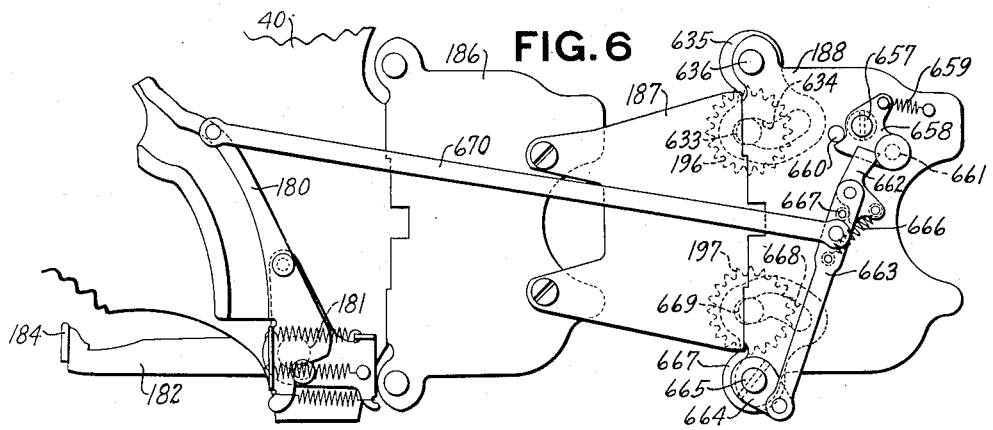
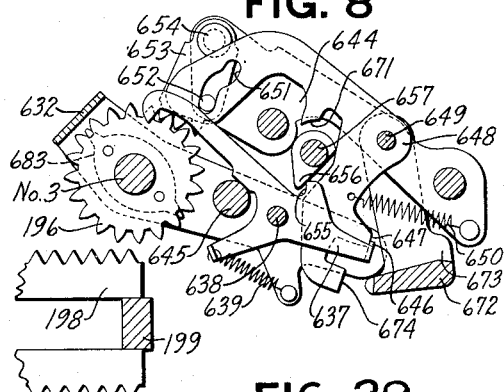
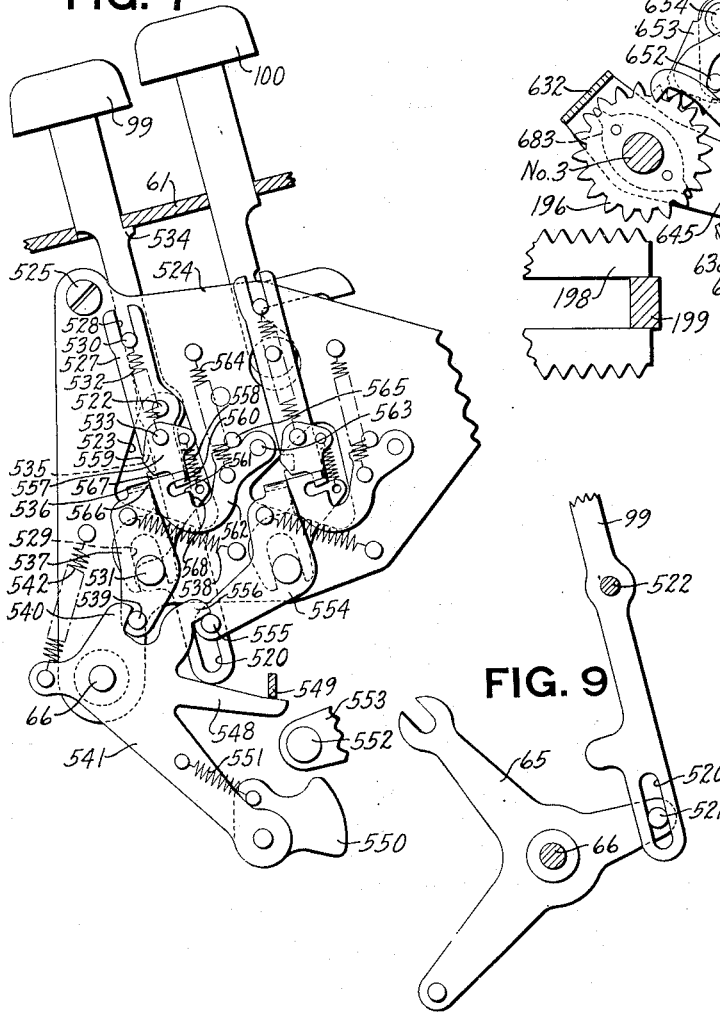
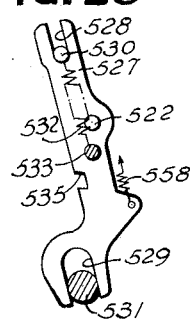

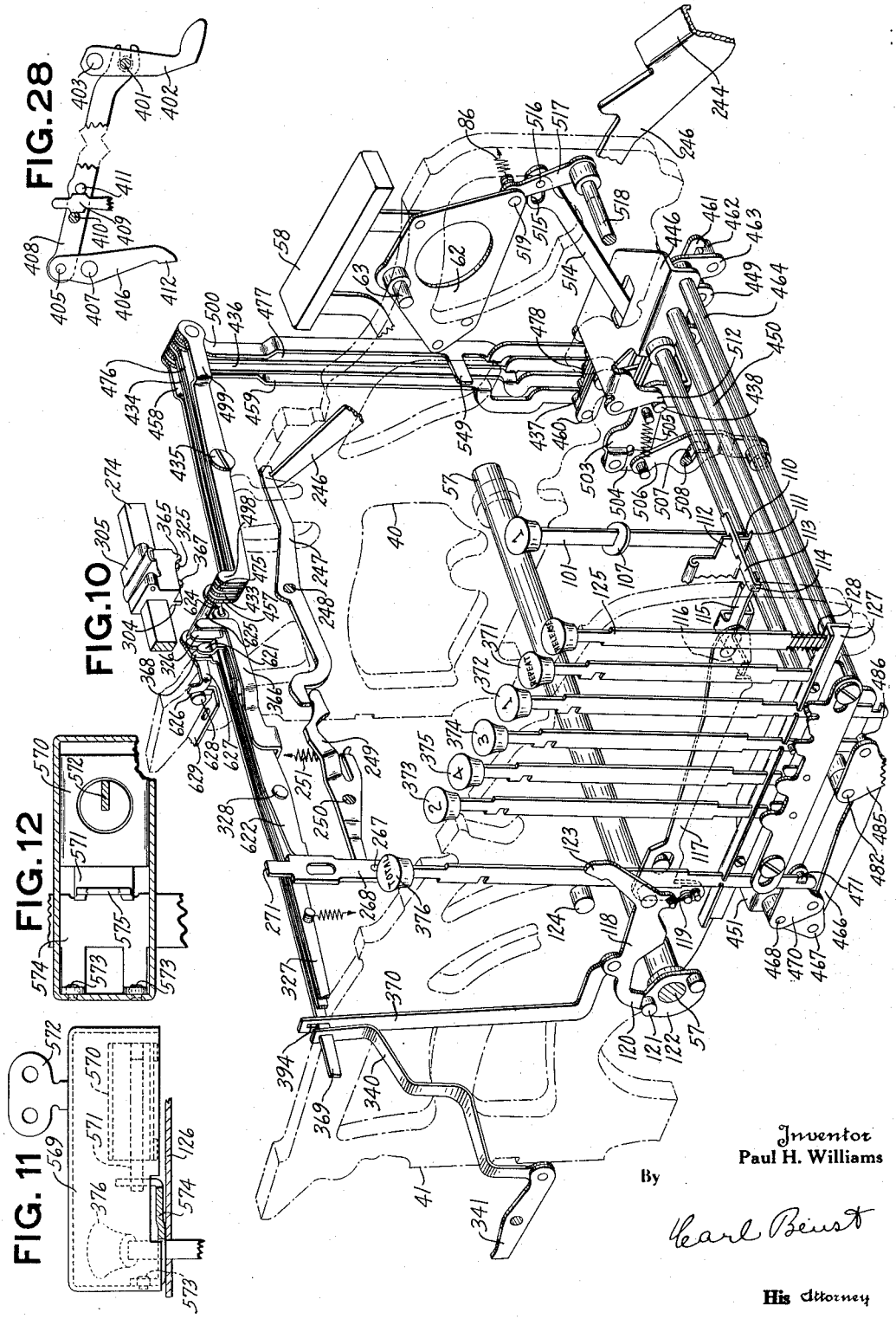

March 16, 1943.  P. H. WILLIAMS  2,313,982
ACCOUNTING MACHINE
Filed June 4, 1938   7 Sheets-Sheet 5
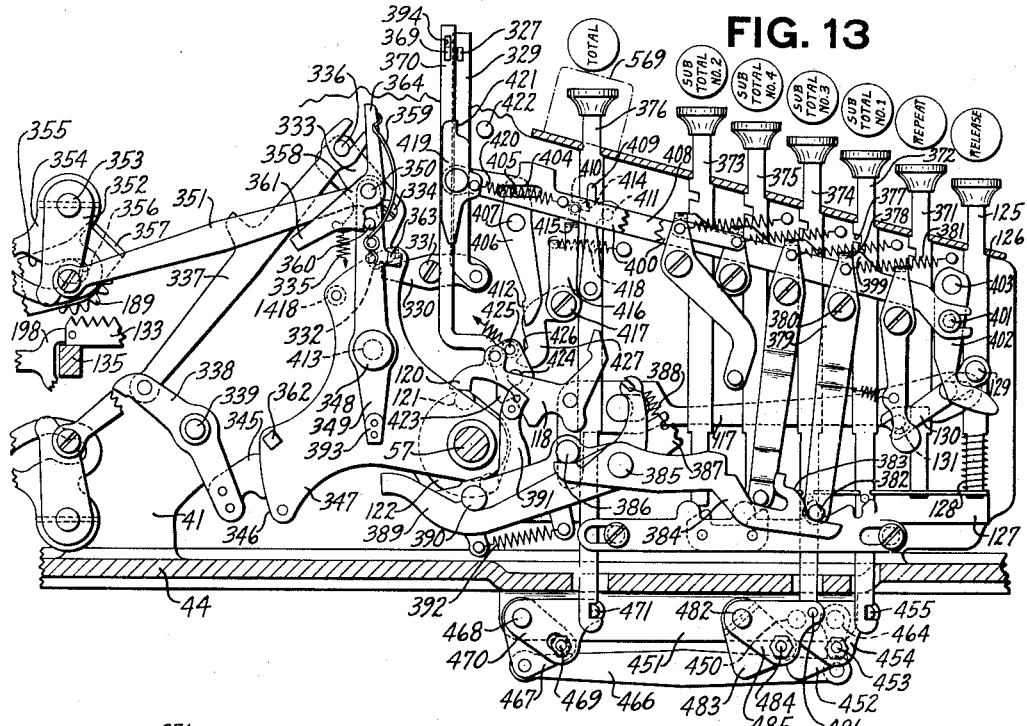
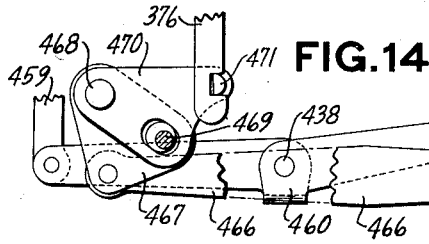
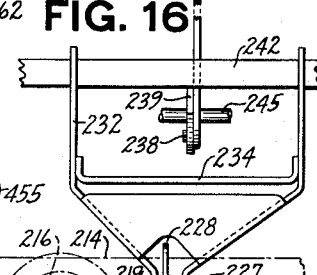
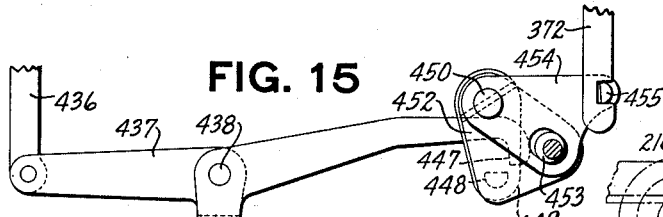
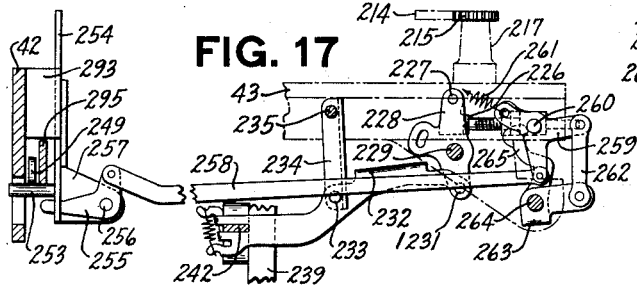
Inventor
Paul H. Williams
By Carl Benst
His Attorney March 16, 1943.            P. H. WILLIAMS                2,313,982
                        ACCOUNTING MACHINE
                    Filed June 4, 1938            7 Sheets-Sheet 6
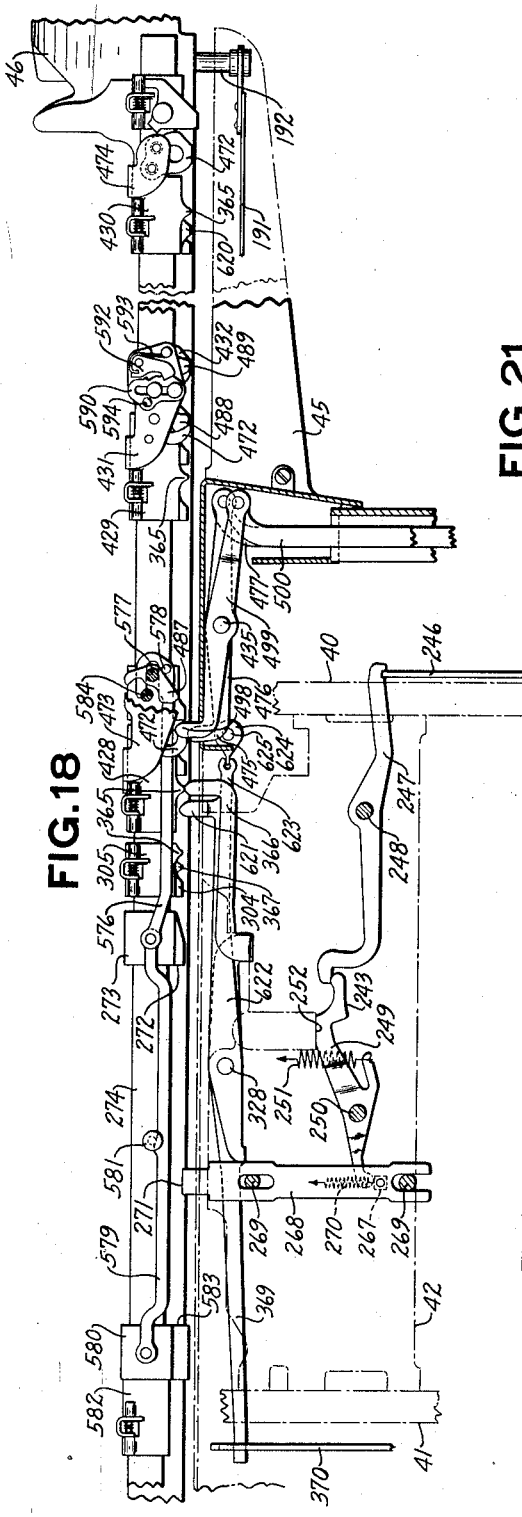
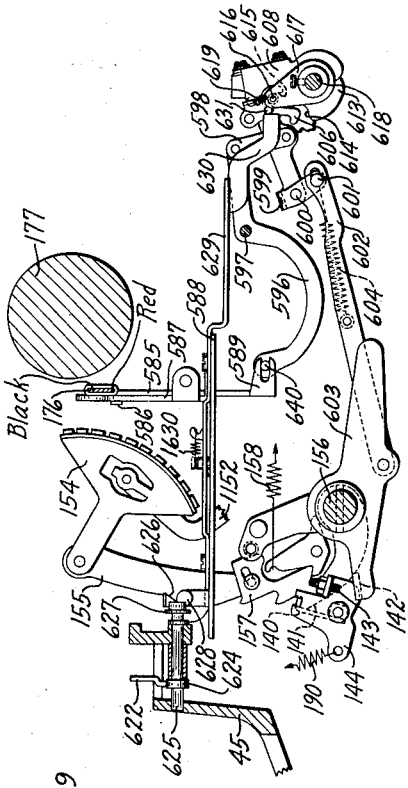
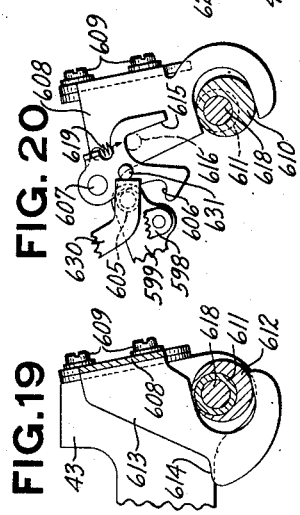
Inventor
Paul H. Williams
By
Carl Benst
His Attorney March 16, 1943.  P. H. WILLIAMS  2,313,982
ACCOUNTING MACHINE
Filed June 4, 1938  7 Sheets-Sheet 7
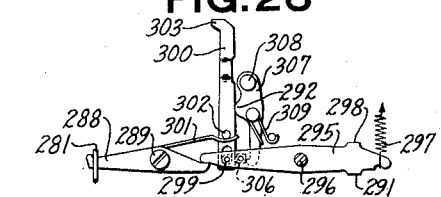
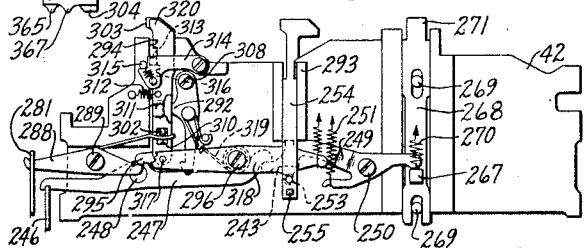
Inventor
Paul H. Williams
By
Carl Benst
His Attorney Patented Mar. 16, 1943

2,313,982

UNITED STATES PATENT OFFICE 2,313,982

ACCOUNTING MACHINE

Paul H. Williams, Dayton, Ohio, assignor to The National Cash Register Company, Dayton, Ohio, a corporation of Maryland Application June 4, 1938, Serial No. 211,817

6 Claims. (Cl. 235—62)

This invention relates to combined adding machines and typewriters, commonly referred to as accounting or bookkeeping machines, and is particularly directed to improvements in the controlling mechanisms of such machines.

Accounting machines of the type referred to above are often used in the preparation of bills or statements having a plurality of detachable portions or slips upon which are printed various data pertaining to the transaction. In order to expedite this class of work, the machine embodying the instant invention is provided with a front feed traveling carriage which, in cooperation with controlling mechanisms, automatically conditions the machine for certain types of operations, causes the machine to operate, and the traveling carriage to tabulate to print the desired data upon the different portions of the bill or statement, in several consecutive and automatic machine operations.

Therefore, broadly, it is an object of this invention to provide an accounting machine for automatically printing various data upon the different portions of a bill or statement.

Another object is to supply means to cause the machine to function automatically through successive cycles.

Still another object is the provision of means, controlled by the traveling carriage, to automatically condition the machine for various predetermined functions and to cause the machine to operate uninterruptedly through successive cycles to record data upon the several detachable portions of a record slip.

Still another object is to provide means, controlled by the traveling carriage, as it tabulates from column to column, to condition the machine for predetermined functions, and to initiate operation of the machine to cause said machine to operate automatically through successive cycles.

A further object is the provision of means whereby the traveling carriage in predetermined columnar positions thereof, causes the machine to operate automatically and also causes various predetermined control keys to be depressed, during such operation, to effect a series of automatic machine operations.

A still further object is to supply means, controlled by the traveling carriage in predetermined columnar positions thereof, to shift the inking ribbon to cause data, relative to the transaction, to be printed in a distinctive color upon a certain portion of the record material.

Another object is the provision of novel means for controlling and operating a consecutive number device.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a longitudinal sectional view, taken just to the right of one of the amount banks, showing said amount bank and its associated actuator mechanism, for positioning the type carrier and the totalizer wheels associated with said amount bank. This view also shows a cross-section of the front feed traveling carriage, and the controlling mechanism associated therewith.

Fig. 2 is an enlarged detail view of several of the control tappets mounted on the traveling carriage, for controlling various functions of the machine.

Fig. 3 is a side elevation, as observed from the right of the machine, illustrating the machine operating mechanism and the controlling mechanism associated therewith.

Fig. 4 is a detail view of a plurality of nested yokes, which constitute a part of the mechanism for controlling automatic operation of the machine.

Fig. 5 is a perspective view illustrating a part of the mechanism for controlling automatic operation of the machine.

Fig. 6 is a right side elevation of the mechanism for controlling and operating the consecutive number device.

Fig. 7 is a detail view of two of the machine starting bars for initiating operation of the machine.

Fig. 8 is a sectional view showing, in detail, one denominational unit of the consecutive number device.

Fig. 9 is a detail view of a portion of the machine starting mechanism.

Fig. 10 is a perspective view showing the hanging bar levers and associated mechanism, for controlling automatic operation of the machine.

Fig. 11 is a detail view of a lock and associated housing, for preventing access to the total control key by unauthorized persons.

Fig. 12 is a fragmentary view of the lock shown in Fig. 11.

Fig. 13 is an elevation, as observed from the left side of the machine, showing the machine control keys and associated mechanism.

Fig. 14 is a detail view of a portion of the mechanism for automatically depressing the total control key.

Fig. 15 is a detail view of a portion of the mechanism for automatically depressing the #1 subtotal key.

Fig. 16 is a plan view of the traveling carriage escapement mechanism.

Fig. 17 is a right side view of the traveling carriage escapement mechanism.

Fig. 18 is a front view of a portion of the traveling carriage, showing the control blocks and tappets mounted thereon, and the hanging bar levers associated therewith, for controlling automatic operation of the machine.

Fig. 19 is a detail view of a part of the ribbon shifting mechanism.

Fig. 20 is another detail view of a part of the ribbon shifting mechanism.

Fig. 21 is a right side elevation of the ribbon shifting mechanism and one of the printing sectors.

Fig. 22 is a facsimile of a fragment of a journal sheet and its associated carbon paper printed by the machine embodying the instant invention.

Fig. 23 is a facsimile of a certain type of money order printed by the present machine.

Fig. 24 is a facsimile of another type of money order printed by the machine of this invention.

Fig. 25 is a facsimile of an application for a money order.

Fig. 26 is a detail view of a portion of the carriage tabulating mechanism.

Fig. 27 is a back view of the carriage tabulating mechanism.

Fig. 28 is a fragmentary detail of a part of the releasing mechanism for the control keys.

Fig. 29 is a detail view of a part of the mechanism shown in Fig. 7.

General Description

The instant invention is shown applied to the Ellis type of accounting machine, the basic principles of operation of which are so well known in the art that it is believed unnecessary to go into a detailed description thereof at this time. Therefore, in this specification, only the mechanism pertinent to the instant invention will be described in detail. However, for a detailed description of the entire machine reference may be had to the following United States Patents: Nos. 1,197,276 and 1,197,278, issued September 5, 1916, to Halcolm Ellis; No. 1,203,863 issued November 7, 1916, to Halcolm Ellis; Nos. 1,939,804; 2,037,717; and 2,082,098 issued, respectively, December 19, 1933, April 28, 1936, and June 1, 1937, to R. A. Christian, and No. 2,079,355 issued May 4, 1937, to Charles L. Lee.

While the present invention is shown embodied in the well known Ellis type of accounting machine, it is not the intention to limit this invention to this particular machine, as it may easily be adapted for use in most any type of accounting machine.

The present machine has a plurality of denominational rows of amount keys, which in adding operations position corresponding actuators in proportion thereto, said actuators in turn positioning corresponding printing sectors and actuating the wheels of the selected totalizers to add therein the amount set up on the keyboard. The present machine is equipped with three adding totalizers and a consecutive number counting device.

The present machine is provided with a laterally shiftable traveling carriage, of the front feed type, in which the platen roll is rockable from printing position to front feeding position to permit the ready insertion of record material into the open throat thereof. The front feed throat comprises a guide table, which also serves as a line locating device for adjusting the record material in relation to the printing line. Adjustable stops, which protrude into the front feed throat, are also provided for locating certain types of record material in relation to the printing line.

The throat of the front feed platen may be opened manually at will, or may be arranged to open automatically in predetermined columnar positions of said traveling carriage. A locking device between the throat-opening mechanism and the machine-releasing mechanism prevents operation of the machine while the throat is open.

The traveling carriage is arranged to be tabulated manually or automatically from column to column by means of tabulating stop lugs, on control blocks adjustably mounted on said traveling carriage, in cooperation with tabulating stop bars and controlling means therefor.

The different totalizers are selected and conditioned for addition by means of camming lugs, on the control blocks, in cooperation with hanging bar levers for the respective totalizers.

The repeat sub-total and total functions of the machine may be controlled manually by the depression of the required ones of a row of control keys, located on the left-hand side of the adding machine keyboard, or automatically by means of control tappets, mounted in predetermined columnar positions on the traveling carriage, which, in cooperation with associated mechanism, select the desired control keys and cause said selected control keys to be automatically depressed during machine operations. Likewise, control tappets adjustably mounted in predetermined columnar positions on the traveling carriage, in cooperation with associated mechanism, cause the machine to operate automatically, when said carriage is in said predetermined columnar positions.

Inasmuch as the traveling carriage, in predetermined columnar positions thereof, may be arranged to select the different totalizers for their different functions, and to also cause the machine to cycle automatically, it is therefore evident that, by the proper arrangement of control tappets and control blocks, the machine may be arranged to perform a series of automatic operations to print the desired data on the various portions of the record material, corresponding to said predetermined columnar positions.

The machine embodying the instant invention is also provided with a selective carriage return mechanism, by means of which the carriage may be returned from tabulated position to starting position, or from predetermined columnar position to predetermined columnar position at the will of the operator. Also, when the traveling carriage reaches the end of its letter-spacing or working movement, the carriage return mechanism is automatically set in motion to return the carriage to starting position.

The present machine is provided with a full complement of typewriter keys for typing the desired data in the various columns or portions of the record material, said typewriter keys, in cooperation with the usual escapement mechanism, causing the traveling carriage to letter-space in its working direction. The traveling carriage is urged in letter-spacing or working direction by means of a spring-actuated reel and a draw-band.

A certain one of the control blocks, on the traveling carriage, has a camming lug, which, in cooperation with a hanging bar lever, causes the two-color inking ribbon to be automatically shifted to print a certain item in a distinctive color.

In certain instances it is desirable not to have the machine cycle automatically, and to this end manual means has been provided for moving the tappets, which control this feature, to ineffective positions.

In the present construction, the three adding totalizers and the consecutive number totalizer are selected and conditioned for sub-total operations by means of their respective sub-total control keys, and these totalizers are selected and conditioned for total operations by means of a total control key, used in conjunction with their respective sub-total control keys.

In order to prevent unauthorized persons from having access to the total key, a locked cover is provided for rendering this key inaccessible.

The mechanism described in general above, which is pertinent to the present invention, will now be described in detail.

DETAILED DESCRIPTION

Framework

The mechanism of the machine embodying the instant invention is supported by main frames 40 and 41 (Figs. 1, 3, 10 and 18) said main frames connected by cross frames 42 and 43, and various other cross frames, rods and shafts.

In figures such as Fig. 10, where the framework is shown in phantom, by dot and dash lines, where the dot and dash lines of such framework do not shown behind the other parts, it indicates that such parts are in front of the framework.

The frames 40 and 41 are secured to a machine base 44, to which is also secured a case or cabinet 45 which encloses the mechanism of the machine, and which supports a laterally shiftable traveling carriage 46 later to be described.

Operating mechanism

The machine embodying the instant invention in driven by a conventional type of continuously running motor 39 (Fig. 3) supported by a framework 47, secured to the machine base 44. The armature shaft 48, of the motor 39, carries a worm wheel 49 which meshes with, and drives, a clutch driving member 50 free on a stud 51 in the framework 47. Also free on the stud 51 and contained within a boring in the driving member 50, is a clutch driven member 52 carrying a stud 53 upon which is pivoted the lower end of a link 54, the upper end of which is free on a stud 55 in a drive arm 56, secured to a main drive shaft 57 journaled in the frames 40 and 41.

A machine starting bar 58 has stems 59 and 60, parallel portions of which extend through and are guided by slots in a plate 61 mounted on the frame 40. The stem 59 is pivotally connected to a plate 62, free on a stud 63 in the frame 40. The plate 62 carries a stud 64 embraced by a bifurcated portion of one arm of a three-armed lever 65, free on a stud 66 in the frame 40, while the stem 60 is pivotally connected to an arm 67 of said lever 65. An arm of the lever 65 carries a stud 68 which cooperates with a shoulder on an arm 69 free on a stud 70 in the frame 40, and having pivotally connected thereto one end of a pitman 71, the other end of which is bifurcated to straddle a stud 72 in the frame 40. The pitman 71 carries a stud 73 embraced by a slot in an upward extension of a lever 74 free on a stud 75 in the motor framework 47.

Depressing the starting bar 58 rocks the plate 62 and the lever 65 counter-clockwise and clockwise, respectively (Fig. 3), to move the stud 68 out of engagement with the shoulder on the arm 69. This frees the arm 69, pitman 71, and lever 74, to the action of a torsion spring 76, which immediately rocks said lever 74 counter-clockwise to move a bent-over ear 77 thereof out of the path of the upper end of a clutch engaging lever 78, free on a stud 79 in the clutch driven member 52. The lever 78 has adjustably connected thereto a plate 80 carrying a stud 81, to which is anchored one end of a clutch band 82, the other end of said band being secured to the clutch driven member 52.

Moving the ear 77 out of the path of the upper end of the lever 78 frees said lever to the action of a spring 83, which immediately rocks said lever 78 counter-clockwise to expand the clutch band 82 to cause said band to grip the inner surface of the continuously rotating clutch driving member 50, whereupon said driving member immediately rotates said driven member counter-clockwise in unison therewith. One revolution of the clutch driven member 52 (Fig. 3), by means of the link 54, oscillates the arm 56 and the main drive shaft 57, first counter-clockwise and back to normal position through an angle of approximately 60 degrees.

During return movement of the link 54 and the arm 56, a flat surface 84 on a stud carried by said link, engages an upward extension 85 of the lever 74 and rocks said lever and the arm 69, clockwise to move the ear 77 into the path of the lever 78 and to move the shoulder on said arm 69 beyond the stud 68. This permits a spring 86 to rock the plate 62 clockwise and the lever 65 counter-clockwise, to return the stud 68 into the path of the shoulder or arm 69, to retain the ear 77 in the path of the upper end of the lever 78 when the stud 84 passes beyond the extension 85. Continued rotation of the clutch driven member 52 causes the upper end of the lever 78 to engage the ear 77 to contract the clutch band 82 to disengage the clutch driven member from the clutch driving member to terminate machine operation.

The lever 78 is assisted in disengaging the clutch band 82 by a cam lever 87 free on a stud 88 in the motor framework 47. The lever 87 is urged clockwise by a compressible spring 89 to maintain a camming surface 95 thereon in the path of a roller 96 mounted on an arm 97 secured to the clutch driven member 52. Near the end of rotation of the clutch driven member 52 the roller 96 engages the camming surface 95 to rock the lever 87 counter-clockwise to compress the spring 89, whereupon the declining portion of said camming surface, in cooperation with said roller, urges the clutch driven member 52 counter-clockwise to assist the lever 78 in contracting the clutch band 82, and retaining said band contracted.

Counter-clockwise engaging movement of the arm 69 and the lever 74 is limited by a downward projection 98 of the pitman 71 contacting the stud 70. One rotation of the clutch driven member 52 and one complete oscillation of the arm 56 and main shaft 57 drive the machine mechanism through one cycle of movement, which is the requisite for adding, total and sub-total operations.

The usual non-repeat mechanism of the type disclosed in United States Patent No. 2,142,341, issued to Charles H. Arnold, is provided for preventing repeat cycling of the machine, when the starting bar 58 is inadvertently retained depressed at the end of a machine operation.

Depressing the starting bar 58 (Fig. 3) also renders mechanism effective which causes the traveling carriage 46 to be automatically tabulated from one columnar position to the next. This mechanism will be described later in connection with the complete description of the traveling carriage.

In addition to the regular starting bar 58, the machine also has a vertical feed starting bar 99 and an auxiliary starting bar 100. Depressing the bar 99 releases the machine for operation and causes the traveling carriage platen roll to be automatically rotated, to line-space the record material supported thereby, but does not initiate automatic tabulation of the traveling carriage. Depressing the auxiliary starting bar 100 initiates what is termed an idle operation of the machine in which the automatic rotation or line spacing of the platen and the automatic tabulation of the traveling carriage are rendered inoperative. The starting bars 99 and 100 will be described in detail later in connection with the traveling carriage.

*Amount keys*

Inasmuch as the different rows of amount keys and the mechanism associated therewith are substantially duplicated in each denominational order, it is believed that a description of the one row of amount keys shown in Fig. 1, and the mechanism associated therewith, will be sufficient for the purpose of this specification.

The row of amount keys 101, shown in Fig. 1, are assembled in a keyboard framework comprising a top plate 102, a partition plate 103, for each row of keys, and right and left side plates (not shown) said side plates being secured to the frames 40 and 41. The upper ends of the keys 101 protrude through, and are guided by, corresponding openings in the top plate 102, while the lower ends of said keys are guided by square studs 105 therein, in cooperation with vertical slots 106 in the partition plate 103, for this particular bank. Each of the keys 101 has encircling the stem thereof a spring 104 compressed between a washer 107, integral with said key stems, and the bottom of an opening 108 in the plate 103. The springs 104 urge the keys 101 upwardly to compress felt washers 109 between the washers 107 and the top surfaces of the openings 108, said top surfaces being formed out of bent over portions of said openings 108 and having slots therein which admit the stems of the keys 101. The felt washers 109 deaden the sound when the amount keys are released by preventing a metal to metal contact between the washers 107 and the top of the openings 108.

Each row of amount keys has a detent plate 112 (Fig. 10) hinged on a rod, not shown, supported by the keyboard framework, said plates being spring urged counter-clockwise.

Depressing one of the keys 101 causes a bent-over lip 110 on the lower end of the stem thereof to by-pass an angular lower edge 111 of the detent plate 112, whereupon said detent latches the key in depressed position. If another key is depressed, in the same row, the bent-over lip 110 of said key rocks the plate 112 clockwise sufficiently to release the key previously depressed, thereby constituting what is termed flexible key action.

Mechanism is provided for automatically rocking the detent plates 112 clockwise, near the end of adding operations, to release the depressed amount keys. The forward ends of the plates 112 extend within a corresponding notch in a bar 113 mounted for horizontal shifting movement in the keyboard framework. The bar 113 has a bent-over portion 114 which engages an arm of a lever 115 pivoted on an extension of the frame 41. The lever 115 has another arm 116 which engages a notch in a key release pitman 117 slidably mounted by means of parallel slots therein in cooperation with corresponding studs in the frame 41. Pivotally mounted on the pitman 117 is a latch 118 urged counter-clockwise by torsion spring 119 to normally maintain the lower surface of a hook-shaped projection 120 thereof in contact with a stud 121 in a disc 122 secured on the main shaft 57.

Initial movement clockwise of the shaft 57, as viewed in Fig. 10, causes the stud 121 to move beyond the hook 120, whereupon the spring 119 rocks the latch 118 counter-clockwise to move said hook 120 into the path of said stud 121. Return movement counter-clockwise of the main shaft 57 causes the stud 121 to engage the hook 120 to shift the latch 118 and pitman 117 rearwardly. Rearward movement of the pitman 117 causes the notch therein in cooperation with the arm 116 to rock the lever 115 in unison therewith, causing the other arm of said lever, in cooperation with the bent-over portion 114, to shift the bar 113 toward the left, as viewed in Fig. 10. Shifting movement of the bar 113 rocks the plates 112 clockwise to disengage the angular edges 111 from the bent-over lips 110 of the depressed keys 101 to release said keys, which are immediately returned to undepressed positions by the springs 104.

After rearward shifting movement of the latch 118 and the pitman 117 has released the depressed amount keys, an upward extension 123, of said latch, engages a stud 124 in the frame 41 and rocks said latch 118 clockwise to disengage the hook 120 from the stud 121, whereupon the pitman 117 and latch 118 are spring-returned a short distance forwardly so that the lower surface of the hook 120 will come to rest on top of the stud 121. The notches in the bar 113 are large enough to permit free movement of the plates 112 when the amount keys are depressed.

In the present machine the amount key releasing mechanism functions as described above, in adding operations. In sub-total and total operations, mechanism, not here shown but fully disclosed in the U. S. Patent No. 1,203,863 referred to above, operates the key releasing mechanism at the start of said operations, to release any amount keys that have been inadvertently depressed.

Manual means is also provided for releasing the depressed amount keys, said manual means including a release key 125 (Figs. 10 and 13), the undercut upper and lower ends of the stem of which fit in corresponding slots in an auxiliary keyboard plate 126 and a bracket 127 both of which are mounted on the frame 41. A compressible spring 128 urges the key 125 upwardly to normally maintain a shoulder, formed by the undercut upper end thereof, in contact with the bottom of the plate 126. They key 125 carries a stud 129 (Fig. 13) upon which is pivoted one end of a link 130, the other end of which is bifurcated to straddle a stud 131 in the pitman 117.

Depressing the release key 125, by means of the link 130, moves the pitman 117 rearwardly to rock the lever 115 to shift the bar 113 toward the left to release the amount keys in the manner explained earlier herein. The bifurcated end of the link 130, in cooperation with the stud 131, permits the pitman 117 to shift rearwardly independently of the release key 125, when the automatic key releasing mechanism functions.

Calling attention to Fig. 1, depressing any one of the keys 101, except the 9 key, moves the square stud 105 therein into the path of a corresponding one of a series of graduated steps 132 on an actuator rack 133, for this particular amount bank, a notched portion of the forward end of which fits in a corresponding slot in a rod 134, supported by the frames 40 and 41, and the rearward end of which is bifurcated to fit a corresponding slotted portion of a bar 135 also supported by the frames 40 and 41. It is, therefore, evident that the actuator 133 is mounted for horizontal reciprocating movement, which is imparted thereto in a manner presently to be described.

Depressing any one of the amount keys 101 also moves a zero latch (not shown), which retains the actuator 133 in zero position, when no amount key is depressed, to ineffective position. There is no corresponding step 132 on the actuator 133 for the stud 105 in the 9 key, and depression of this key merely releases the zero latch and the rack travels the full distance rearwardly until a wall 136 formed by the notched forward end thereof, contacts the rod 134.

The actuator 133 has a vertical slot 137 which straddles a stud 138 in a segmental portion 139 of a reducer arm 145, free on a shaft 146 journaled in the frames 40 and 41. A spring 147, tensioned between the segment 139 and a leading bar 148 extending between two similar arms 149, only one here shown, secured on the shaft 146, normally maintains a projecting portion of the segment 139 in yieldable contact with the leading bar 148.

When the arm 56 (Fig. 3), is oscillated, in the manner explained earlier herein, a roller 150, carried thereby, in cooperation with an irregular camming slot 151 in a cam plate 152, secured on the right-hand end of the shaft 146, rocks said shaft, the arms 149 (Fig. 1) and the leading bar 148 first rearwardly or counter-clockwise and then back to normal position through an invariable excursion during each machine operation. Initial movement rearwardly, or counter-clockwise, of the leading bar 148, by means of the spring 147 (Fig. 1), causes the segment 139, the reducer arm 145, and the actuator 133 to travel in unison therewith, until such movement of said actuator is terminated by one of the steps 132 thereon, contacting the stud 105 in the depressed amount key 101. This positions the actuator and the reducer arm 145 in proportion to the depressed amount key, and the leading bar 148 completes its rearward movement independently of the segment 139, flexing the spring 147.

Initial movement counter-clockwise of the reducer arm 145, by means of a link 1152 (Figs. 1 and 21), connected between an arm 153 of said reducer arm and a printing sector 154, for this particular amount bank, positions said printing sector in proportion to the depressed amount key. The printing sector 154 is pivotally mounted on an arm 155 free on a printer shaft 156 journaled in the printer framework and the frame 40. The arm 155 is connected to a release and anti-rebound plate 157 also free on the shaft 156 and a spring 158, tensioned between a bail 159 secured on the shaft 156 and a pawl 160 connected between the arm 155 and plate 157, urges said plate, said arm and the printing sector 154 clockwise. However, such movement of these parts is restrained by a tooth on the plate 157 in cooperation with a tooth 161 on a zero elimination pawl 162, free on a rod 163 supported by the printer framework, said pawl being urged clockwise by a spring 164 into engagement with said plate 157.

Initial movement counter-clockwise of the reducer arm 145 causes a stud 165 in an extension thereof, in cooperation with an arcuate surface 166 on an extension of the pawl 162, to rock said pawl counter-clockwise out of engagement with the tooth of the plate 157. Each zero elimination pawl 162 has a bent-over ear 167 which overlies a surface 168 on the next higher order zero elimination pawl, thus providing a medium through which all the lower order pawls 162 are moved to ineffective positions to release the corresponding printing sectors so that the zeros will be printed in the lower orders, when no keys are depressed in said orders. After the pawl 162 (Fig. 1) has been rocked to ineffective position, the sector 154, the arm 155, and the plate 157 are restrained against movement, under influence of the spring 158, by a printer release latch 140, pivotally mounted in the printer framework, in cooperation with a tooth 141 on the plate 157.

Referring to Fig. 3, the drive arm 56, for the main shaft 57, is connected by a link 169 to an arm 170 pivotally connected to an arm 171 integral with a hub 172 secured on the printer shaft 156. Two springs 173, stretched between the arms 170 and 171, urge said arm 170 into contact with the hub 172 and form a yieldable connection between said arms 170 and 171. Initial movement counter-clockwise of the arm 56, by means of the link 169 and arms 170 and 171, rocks the shaft 156 and the bail 159 (Figs. 1 and 21) clockwise to increase the tension of the spring 158, and moves a rod 174, supported by the arms of the yoke 159, away from an inclined surface 175 of the plate 157.

After the actuator 133 and the printing sector 154 have been positioned, continued clockwise movement of the shaft 156 causes a projection 142, on the arm 603 (Fig. 21), to engage an adjusting screw 143 in a plate 144 secured to the latch 140, to rock said latch counter-clockwise, against the action of a spring 190, out of engagement with the tooth 141 to free the plate 157, arm 155, and printing sector 154 to the action of the spring 158. The spring 158 immediately rocks the above parts clockwise, causing the printing sector 154, during its hammer-like movement, to suddenly force an inking ribbon 176 (Figs. 1 and 21), and the record material against a platen roll 177, supported by the carriage framework 46, to print the value of the depressed key upon said record material.

Directing attention to Fig. 1, after the leading bar 148 has completed its initial movement rearwardly to cause the actuator 133, arm 145 and printing sector 154 to be positioned, a roller 178 (Fig. 3) mounted on the same axle as the roller 150, said axle being supported by the arm 56, in cooperation with a camming groove 179 in an arm 180 flexibly connected to an aliner shaft 181 journaled in the frames 40 and 41, rocks said shaft clockwise, near the end of the initial movement counter-clockwise of the arm 56. Secured on the shaft 181 (Fig. 1), and moving in unison therewith, are two arms 182, only one here shown, supporting a cross bar 183 having secured thereto an alining bar 184, which upon clockwise movement of said shaft 181 engages the proper one of a series of teeth 185 cut in the periphery of the segment 139, to aline said segment, the printing sector 154 and the actuator 133 while printing is being effected, and while the totalizers are being engaged with said actuator, in adding operations.

After printing has been effected, return movement clockwise of the arm 56 (Fig. 3) causes the roller 178, in cooperation with the cam groove 179, to rock the shaft 181 counter-clockwise to normal position to disengage the aliner 184 (Fig. 1) from the segment 139. Continued return movement clockwise of the arm 56 causes the roller 150 in cooperation with the cam slot 151 to return the shaft 146 and the leading bar 148 clockwise. During its return movement the leading bar 148 picks up the reducer arm 145 and returns said arm, the printing sector 154, and the actuator 133 forwardly to normal or zero position, as shown in Fig. 1, where the zero latch again becomes effective to retain said actuator and connected parts, in zero position.

Return movement clockwise of the arm 56 and the shaft 57, by means of the link 169 (Fig. 3), also returns the printer shaft 156 and the bail 159 counterclockwise, causing the rod 174 (Fig. 1), in cooperation with the surface 175, to return the plate 157, arm 155 and printing sector 154 to normal positions, as here shown, whereupon the tooth 161 of the pawl 162 reengages the tooth of the plate 157 and the release latch 140 reengages the tooth 141 in preparation for the succeeding operation.

*Totalizers*

The machine embodying the present invention has four totalizers, numbered 1 to 4, respectively (Fig. 1), assembled in vertical pairs at the rear of the machine. The #1 and #2 totalizers are mounted in a framework 186, secured to the main frames 40 and 41, and two plates 187, only one here shown, connect the framework 186 to a framework 188, which supports the #3 and #4 totalizers. Each of the four totalizers has a single set of wheels, adapted to be actuated by their corresponding actuators 133 and extensions 198.

In the present adaptation the #3 totalizer is used as a consecutive number device and is advanced step by step in a manner later to be described.

Wheels 189 and 195 of the #1 and #2 totalizers, corresponding to the denomination illustrated in Fig. 1, are arranged to cooperate respectively with rack teeth on the upper and lower surfaces of the bifurcated portion of the actuator 133. Wheels 196 and 197 of the #3 and #4 totalizers are adapted to cooperate respectively with teeth on the upper and lower surfaces of the bifurcated portion of an extension 198 connected to the actuator 133 and supported by a slotted bar 199 mounted in the framework 188.

The #1, 2 and 4 totalizers are adding totalizers, and taking the #1 totalizer as an example, after the leading bar 148 (Fig. 1) has completed its initial movement rearwardly and the actuator 133 has been positioned by the depressed amount key 101, mechanism, controlled by the traveling carriage and presently to be described, causes the wheel 189 to be engaged with the actuator 133 and return movement forwardly of said actuator, under the influence of the leading bar 148, rotates said wheel 189 in a clockwise direction to add therein the value of the amount set up on the depressed amount key 101. When the wheel 189 passes through zero, one of two diametrically opposed teeth on a tripping cam 200, integral with said wheel, engages the tooth of a tripping pawl 201 and rocks said pawl clockwise to unlatch the carry mechanism, which causes the wheel of the next higher order to be advanced one step. Further description of the carry or transfer mechanism is believed unnecessary, as this mechanism is old and is well known in the art and is shown and described in the above-named Patent No. 1,197,276. After the actuator 133 has completed its return movement forwardly, in adding operations, the #1 totalizer is rocked out of engagement therewith.

In total and sub-total operations the wheel 189 of the #1 totalizer is rocked into engagement with the actuator 133 prior to the initial movement rearwardly of said actuator, which movement reversely rotates said wheel to zero position, which position is determined by one of the diametrically opposed teeth on the tripping cam 200 coming into contact with the pawl 201. This positions the wheel 189, the actuator 133, and the printing sector 154 in accordance with the amount standing on said wheel, after which functioning of the printing mechanism causes this amount to be recorded on the record material.

In total operations the wheel 189 is rocked out of engagement with the actuator 133 prior to its return movement forwardly, and consequently said wheel remains in a zeroized condition. In sub-total operations the wheel 189 remains in engagement with the actuator 133 during its return movement forwardly, and consequently is returned to its original position.

The totalizer engaging mechanism will be explained more in detail later in connection with the traveling carriage mechanism.

*Traveling carriage*

The traveling carriage 46 (Fig. 1) is supported for horizontal shifting movement on the case 45 by means of corresponding ways 202 and 203 mounted respectively near the rear of the traveling carriage and the case, said ways having therebetween ball bearings 204, which reduce friction and insure accurate alinement of the platen 177 with the printing mechanism. The front of the traveling carriage is shiftably supported by means of rollers 205, carried thereby, in cooperation with a rail 206, mounted on the case 45. A series of rollers 207 on the carriage, in cooperation with a recessed or horizontally grooved portion of the rail 206, prevents the front of the traveling carriage from tilting upwardly and a series of brackets 208 secured to the frame of the traveling carriage, in cooperation with a flanged portion of the way 203, prevents the rear of the traveling carriage from tilting upwardly.

The platen roll 177 is mounted in a rockable framework which in turn is supported by the traveling carriage framework 46, and said platen is adapted to be rocked from printing position, as shown in full lines in Fig. 1, to a more accessible position, sometimes referred to as open-throat position and shown in dot and dash lines, for the front-feeding of record material therearound. When the platen 177 is rocked to front-feeding position a plurality of pressure rollers 209 are moved out of engagement with said platen and a front-feed guide chute 210 is rocked forwardly to an inclining position, as shown in dot and dash lines Fig. 1, to facilitate the insertion of record material at the front of the platen. Moving the rollers 209 out of contact with the platen 177 opens a throat 211, formed by a journal sheet guide table 212 and a statement sheet guide table 213, for guiding record material around said platen roll 177.

The throat 211 of the front feed platen may be opened manually or automatically, the latter being controlled by tappets located in predetermined columnar positions of the traveling carriage. The usual mechanism (not here shown) locks the machine against operation when the platen 177 is in front feeding position. The above mechanism is fully described in the co-pending application, Serial No. 653,838, filed January 27, 1933, by R. A. Christian.

Escapement mechanism

Referring to Figs. 1 and 18, the traveling carriage 46 is constantly urged in a letter-spacing, working or tabulating direction by the usual spring-actuated reel (not shown) and its associated draw band 191, one end of said draw band being connected to a stud 192 in the framework of the carriage 46. The traveling carriage is normally restrained against movement in a working direction, under influence of the spring-actuated reel and the draw band 191, by the well known escapement mechanism shown in Figs. 16 and 17 and now to be briefly described.

Mounted on the framework 46 of the traveling carriage and parallel to the direction of travel of said carriage, is a rack 214 which meshes with a pinion 215 secured on the upper end of a vertical shaft 216 (Figs. 1, 16 and 17), journaled in a bushing 217 which extends through an opening in the case 45 and is secured in the cross frame 43. Secured to the lower end of the shaft 216 is an escapement ratchet 218, the teeth of which cooperate with an escapement pawl 219 free on a stud 220 secured in the frame 43. Also free on the stud 220 is an escapement operating and control plate 221, which supports a torsion spring 222, tensioned to urge the escapement pawl 219 counter-clockwise into engagement with the teeth of the ratchet 218 until such movement is terminated by an extension of said pawl contacting an eccentric 223, mounted on the plate 221. The eccentric 223 provides means for adjusting the escapement pawl 219 in relation to the teeth of the ratchet 218 and also for disengaging said pawl from said ratchet, when the escapement mechanism functions, in a manner presently to be described.

Pivotally mounted on the plate 221 is an escapement control pawl 224, which, in cooperation with the teeth of the ratchet 218, prevents the escapement of more than one tooth of said ratchet at a time. A right angled portion of the plate 221 (Fig. 16) has a hole therein into which fits loosely one end of a rod 225, the other end of which is secured to a bracket 226 fulcrumed on a stud 227 in a lever 228 pivoted on a stud 229 in the frame 43. A spring 230, tensioned between the stud 227 and the plate 221, normally maintains said plate in contact with an adjustable collar 231 free on the rod 225 and adapted to be adjusted by an adjusting nut and its associated lock nut, assembled on a threaded portion of said rod 225, to regulate the throw of the plate 221 and the pawls 219 and 224. A hole in the lower end of the lever 228 fits freely on a stud 1231 extending between two arms of a yoke 232 fulcrumed on studs 233 in a bracket 234 pivotally mounted on two trunnions 235, in a recessed portion of the frame 43.

The machine embodying the instant invention has a typewriter attachment consisting of a full complement of typewriter keys, a representative one (236) of which is shown in Fig. 16. The key lever 236 is free on a rod 237 supported by the base 44 (Fig. 13), and said key lever carries a stud 238 which cooperates with a camming slot in a type and escapement operating lever 239 free on a rod 245 supported by the frames 40 and 41.

Depressing the typewriter key 236, by means of the stud 238 in cooperation with the camming slot in the lever 239, rocks said lever counter-clockwise, as viewed in Fig. 17, causing said lever, in cooperation with a universal bar 242, retained in slots in the forward ends of the two arms of the yoke 232, to shift said yoke, the bracket 234, and the lever 228 forwardly or clockwise (Fig. 17). Clockwise movement of the lever 228 shifts the rod 225 rearwardly, thereby rocking the plate 221 clockwise as viewed in Fig. 16. Clockwise movement of the plate 221 causes the eccentric 223 to disengage the tooth of the pawl 219 from the teeth of the escapement ratchet 218 to permit the traveling carriage 46 (Figs. 1 and 18) to letter-space toward the left, under the influence of the spring-actuated reel and the draw band 191. Clockwise movement of the plate 221 (Fig. 16) also rocks the tooth of the pawl 224 into the path of the teeth of the ratchet 218 to prevent more than one tooth from escaping the pawl 219 at one time. When the typewriter key 236 is released, the plate 221 and connected mechanism are spring returned to normal positions, as shown in Fig. 16, to rock the escapement pawl 219 into engagement with the succeeding tooth of the ratchet 218.

Typewriter tabulating mechanism

A manipulative lever 246 (Figs. 10 and 18), usually referred to as "the typewriter tabulating lever," is provided for tabulating the traveling carriage to predetermined columnar position. The typewriter tabulating lever 246 (Fig. 10) terminates in a finger-piece 244, conveniently located in relation to the typewriter keyboard.

Depressing the tabulating lever 246 causes the rearward end thereof (Fig. 18), in cooperation with a notched portion of a lever 247 free on a stud 248 in the frame 42 (Fig. 18), to rock said lever counter-clockwise as here viewed. Counter-clockwise movement of the lever 247 causes a hook-shaped projection thereof, in cooperation with the rounded end of a lever 249 free on a stud 250 in the frame 42, to rock said lever clockwise against the action of a spring 251, which normally maintains a flat portion of said lever 249 in contact with the bottom of a pad 252 on the frame 42. Clockwise movement of the lever 249 causes a downward surface 243 thereof, in cooperation with a pin 253 (Figs. 17 and 27) in a plunger 254 mounted to shift vertically in a slot in the frame 42, to move said plunger downwardly. An aperture in the plunger 254 embraces an extension of a lever 255 free on a stud 256 in a bracket 257 secured to the frame 42, from which it is apparent that downward movement of the plunger 254 rocks the lever 255 counter-clockwise as here viewed.

Counter-clockwise movement of the lever 255, by means of a link 258 connecting said lever to one arm of a three-armed lever 259 free on a stud 260 in the frame 43, rocks said lever 259 clockwise against the action of a spring 261. A link 262 (Figs. 16 and 17) connects an arm of the lever 259 to an arm of a yoke 263 free on a rod 264 supported by downward extensions of the frame 43. Therefore, clockwise movement of the lever 259 is transmitted to the yoke 263 causing an extension 265 thereof, in cooperation with a projection 266 (Fig. 16) of the escapement pawl 219, to rock said pawl clockwise out of engagement with the teeth of the ratchet 218. This releases the traveling carriage 46 (Figs. 1 and 18) to the action of the spring reel and the draw band 191, which immediately moves said carriage toward the left in a working or tabulating direction.

Clockwise movement of the lever 249, as viewed in Fig. 18, and counter-clockwise movement of said lever, as viewed in Fig. 27, withdraws a rounded nose, on an extension thereof, from a square stud 267 in a tabulating stop bar 268 mounted to shift vertically by means of slots therein in cooperation with screw studs 269 in the frame 42. This releases the plunger 268 to the action of a spring 270, which shifts said plunger upwardly to move the upper end 271 thereof into the path of a projection 272 of a typewriter tabulating stop 273 slidably mounted on a tabulating stop bar 274 secured to the traveling carriage 46. The projection 272 contacting the upper end of the plunger 268 moves the stop 273 into engagement with a stationary control block 305, also mounted on the bar 274, to terminate tabulating movement of the traveling carriage. After tabulating movement of the carriage has been terminated, releasing the tabulating lever 246 permits the spring 261 (Fig. 17) to return the lever 259 and the yoke 263 counter-clockwise to withdraw the extension 265 of said yoke from the projection 266 (Fig. 16) of the pawl 219 to permit the torsion spring 222 to return said pawl into engagement with the teeth of the ratchet 218, to hold the traveling carriage against further tabulating movement. Also, releasing the typewriter tabulating lever 246 (Fig. 18) causes the spring 251 to return the lever 249 counter-clockwise to normal position, as here shown, to move the stop bar 268 downwardly out of the path of the stop 273, so that said stop will not interfere with subsequent movement of the traveling carriage in its working or tabulating direction.

*Accounting machine tabulating mechanism*

Tabulating mechanism entirely independent of the typewriter tabulating mechanism just described, and usually referred to as "the accounting machine tabulating mechanism" is provided for tabulating the traveling carriage to various columnar positions. Initiating machine operation by depressing the starting bar 58 (Fig. 3) causes the accounting machine tabulating mechanism to function automatically, or said tabulating mechanism may be operated manually by depressing a tabulating key 275, located on the right-hand side of the accounting machine keyboard between the vertical feed and auxiliary starting bars 99 and 100. A manipulative lever 276 (Fig. 3), one end of which protrudes through a slot in the keyboard plate 51, is provided for rendering the automatic tabulating mechanism effective or ineffective at will.

Directing attention to Fig. 3, pivotally mounted on the link 169, which operates the printer shaft 156, is a tabulating hook 277 urged clockwise by a spring 278, to normally maintain a bent-over projection or ear 279 thereof in contact with the edge of said link 169. As previously explained, a machine operation consists of one oscillation of the arm 56, initial movement counter-clockwise of which raises the link 169 causing the hook 277, under certain conditions, to latch over a stud 280, secured in one end of a tabulating lever 281 pivoted on a stud 282 in the frame 40. However, the stud 280 is normally protected from engagement by the hook 277 by a footshaped extension 283 of a lever 284 pivoted in a slot in a stud 285 secured in the frame 40. A spring 286 urges the lever 284 toward the left to normally retain the foot-shaped extension 283 in the path of the hook 277, whereupon said hook rides idly over the sole of the foot 283, during up-and-down movement of the link 169, without engaging the stud 280.

However, depressing the starting bar 58 causes the lever 284 to be rocked toward the right, in the manner explained in the beforementioned Patent #2,082,098, to move the foot 283 out of the path of the hook 277, whereupon upward movement of the link 169 causes said hook to latch over the stud 280, and downward movement of said link causes the hook 277, in cooperation with the stud 280, to rock the lever 281 clockwise, until said hook rides off of said stud. Clockwise movement of the lever 281 causes the traveling carriage to tabulate, as will be explained presently.

The lever 281 (Figs. 3, 26 and 27) has a slot 287 into which extends one end of a lever 288 pivoted on a stud 289 in the frame 42. The other end of the lever 288 underlies the rounded nose of a lever 295 free on a stud 296 in the frame 42 and urged counter-clockwise by a spring 297, which normally maintains a raised surface 298 on said lever 295 in contact with the bottom surface of a pad 293, a slotted portion of which supports the plunger 254. A stud 299 (Fig. 26) in the lever 295 extends within a slot in a tabulating stop bar 300, loosely contained in a vertical slot 294 in an enlarged portion of the frame 42. A torsion spring 301, in cooperation with a stud 302 in the stop bar 300, urges said bar upwardly to normally maintain the bottom of the slot in said bar in contact with the stud 299.

Clockwise or downward movement of the lever 281 (Figs. 5, 26 and 27), under influence of the hook 277, as explained above, causes the slot 287 therein to rock the levers 288 and 295 counter-clockwise and clockwise, respectively, against the action of the spring 297. Clockwise movement of the lever 295 permits the spring 301, in cooperation with the stud 302, to raise the stop bar 300 upwardly to move a left-hand projection 303 thereof into the path of a stopping lug 304 on the control block 305, adjustably mounted on the stop bar 274 (see also Fig. 18). Clockwise movement of the lever 295 causes a square stud 306 (Fig. 26), carried thereby, to move beyond the latching surface of a latch 307, pivoted on a stud 308 in the frame 42, whereupon a torsion spring 309 rocks said latch clockwise into the path of the stud 306 to obstruct return movement counter-clockwise of the lever 295, when the hook 277 rides off of the stud 280 (Fig. 3), in the manner explained above.

Upon clockwise movement of the latch 307, a hump 292 thereon, in cooperation with the right edge of the stop bar 300, rocks said bar toward the left, as viewed in Fig. 26, into contact with the left wall of the slot 294. Clockwise movement of the lever 295 causes an enlarged surface 291 thereof, in cooperation with the stud 253 (Fig. 27), to rock the escapement plunger 254 downwardly, causing the mechanism shown in Figs. 16 and 17 to disengage the escapement pawl 219 from the ratchet 218, to free the traveling carriage for tabulating movement, which is effected in the manner explained earlier herein.

The stud 302 (Fig. 27) extends through an aperture 310 in an escapement control bar 311 mounted in the vertical recess 294, adjacent the tabulating bar 300. A spring 312 urges the bar 311 toward the left, as here viewed, to normally retain one surface of a notch 316 therein in contact with a square stud 313 in an arm 314 pivotally mounted on the frame 42 and spring-urged clockwise into engagement with a stop stud 315. A stud 317 pivotally connects the lower end of the bar 311 to an escapement control lever 318, similar in outline to the lever 295 and pivotally mounted adjacent thereto on the stud 296. A torsion spring 319 urges the lever 318 counter-clockwise to normally maintain a raised surface thereon, similar to the surface 298 on the lever 295, in contact with the pad 293.

Upward movement of the bar 300 (Figs. 26 and 27), as explained previously, causes the stud 302, in cooperation with the aperture 310, to carry the bar 311 upwardly in unison therewith, until a recessed portion of the notch 316 latches over the stud 313. Upward movement of the bar 311 rocks the lever 318 clockwise and an enlarged surface thereon similar to the surface 291 on the lever 295, in cooperation with the stud 253, and through the medium of the notch 316 and stud 313, retains the escapement mechanism disengaged, after the bar 300 and its associated lever 295 have been returned to normal positions, in a manner and for a purpose presently to be described.

When the escapement mechanism is rendered ineffective, as explained above, the spring actuated reel and the draw band 191 immediately move the traveling carriage in a tabulating or working direction, which is toward the left, as viewed in Fig. 18, and toward the right as viewed in Fig. 27. Tabulating movement of the traveling carriage is terminated by the stopping lug 304 on the control block 305 (Fig. 27) contacting the projection 303 and carrying the stop bar 300 a slight distance clockwise or toward the right against the action of the torsion spring 309 until said stop bar contacts the right-hand wall of the recess 294. The projection 303 of the bar 300 being slightly longer than a similar projection 320 on the bar 311, which is moved into the path of the lug 304 when said bar 311 moves upwardly, protects said projection 320 from the stop lug 304, and therefore the notch 316 remains engaged with the stud 313. Clockwise movement of the bar 300 (Figs. 26 and 27), in cooperation with the hump 292, rocks the latch 307 counter-clockwise to disengage said latch from the stud 306 to release the lever 295 and the bar 300 to the action of the spring 297.

Abruptly terminating the tabulating movement of the traveling carriage, in this manner, causes said carriage to rebound a slight distance, at which time the spring 297 returns the lever 295 and the bar 300 counter-clockwise and downwardly respectively, to move the projection 303 out of the path of the stop lug 304. The bar 311, which is still retained in its upward position, in cooperation with the lever 318 (Fig. 27), continues to hold the plunger 254 in its downward position to retain the escapement mechanism in ineffective position.

Rebounding movement of the traveling carriage causes the stopping lug 304 to engage the projection 320 to rock the bar 311 clockwise out of engagement with the stud 313, whereupon the spring 319 immediately returns said bar downwardly and the lever 318 counter-clockwise to normal positions, as here shown. Counter-clockwise return movement of the lever 318 permits the escapement plunger 254 (Figs. 16, 17 and 27) to return upwardly, under influence of the spring 261, to rock the yoke 263 counter-clockwise to normal position, as here shown, to move the extension 265, of said yoke, out of engagement with the projection 266 of the escapement pawl 219, to permit said pawl to reengage the teeth of the ratchet 218 to hold the traveling carriage against further tabulating movement.

From the foregoing description it is evident that initiating machine operation by depressing the motor bar 58 (Fig. 3) causes the lever 281 to be rocked clockwise by the hook 277 to automatically tabulate the traveling carriage.

As previously stated, the accounting machine tabulating mechanism may be operated manually by depressing the key 275. Depressing the key 275 causes a stud 321 in the lower end thereof, in cooperation with a shoulder 322 on an arm 323 pivotally connected to the lever 281 and urged counter-clockwise or forwardly by a spring 324, to normally maintain a bent-over ear thereof in contact with the lower surface of said lever 281, to rock said lever clockwise to cause the traveling carriage to tabulate in exactly the same manner as explained above. After the lever 281 has been rocked a sufficient distance clockwise to render the tabulating mechanism effective, the stud 321 rides off of the shoulder 322, rocking the arm 323 clockwise against the action of the spring 324. This permits the lever 281 to return counter-clockwise to normal position in case the tabulating key 275 is retained depressed, and when said tabulating key 275 is released it is spring-returned upwardly during which movement the stud 321 by-passes the shoulder 322 and the parts come to rest in the positions shown in Fig. 3.

Angular camming surfaces on the tops of the bars 300 and 311 (Figs. 26 and 27) permit the stop lugs 304 to by-pass said bars, in case the traveling carriage is accidentally returned toward the left, as here viewed, after said bars have been moved upwardly into the path of said stop lugs 304.

As previously explained, the accounting machine tabulating mechanism may be rendered effective or ineffective for automatic operation by the manipulative lever 276 (Fig. 3), which is conveniently located on the right-hand side of the keyboard. When this lever is in its rearward position, as here shown, the automatic tabulating mechanism is effective and functions when the motor bar 58 is depressed. Moving the lever 276 forwardly renders the automatic tabulating mechanism ineffective at all times irrespective of whether the motor bar 58 is depressed or not.

If a more complete description is desired of the lever 276 and the mechanism connecting the motor bar 58 to the control lever 284 reference may be had to the Christian Patent No. 2,082,098.

*Adding operations*

The Nos. 1, 2 and 4 totalizers are selected for addition by means of add hanging bar levers in cooperation with corresponding tappet lugs on a series of control blocks, one of which (305) has been previously described, located in the various columnar positions of the traveling carriage on the stop bar 274 (Fig. 18). In the present adaptation the #3 totalizer is used as a consecutive number device and the hanging bar lever normally used for selecting this totalizer for addition is here used as an automatic control of the bichrome inking ribbon. Inasmuch as similar mechanism is used to select the three totalizers for addition, it is believed that a description of the mechanism used in connection with the #1 totalizer will be sufficient.

The control block 305 (Figs. 10 and 18) has a tappet lug 325 adapted to cooperate with the upturned end 326 of a #1 add hanging bar lever 327, free on a stud 328 in the frame 42. A link 329 (Fig. 13) connects the hanging bar lever 327 to an add-control pawl 330 free on a stud 331 in the frame 41, and the rearward end of said pawl is normally in the path of a shoulder 332 on an add control plate 333, free on a stud 334 in the frame 41, and urged counter-clockwise by a spring 335. The plate 333 has a stud 336 embraced by the bifurcated upper end of a link 337, the lower end of which is pivotally connected to a lever 338 loose on a stud 339 in the frame 41. The lever 338 has secured to the lower end thereof a shoe 345, the sole of which cooperates with an arcuate surface 346 on a totalizer engaging plate 347 secured on the main shaft 57.

A stud 348 in the plate 347 rotatably supports a totalizer engaging lever 349, having in the upper end thereof a stud 350, which pivotally supports one end of a link 351, the other end of which is pivotally connected to an arm 352 secured on a #1 totalizer engaging shaft 353 journaled in the totalizer framework 186 (Fig. 1). Also secured on the engaging shaft 353 are two similar cams 354, only one here shown, having similar camming slots 355, which cooperate with rollers 356 mounted on opposite ends of a rockable frame 357, which supports the #1 totalizer. Pivotally mounted on the stud 350 (Fig. 13) is a totalizer engaging pawl 358 urged counter-clockwise by a spring 359 to normally maintain a projection thereof in contact with a stud 360 in the lever 349.

An extension 361 of the pawl 358, in cooperation with a square stud 362 in the plate 347, is adapted to rock the #1 totalizer into engagement with the actuators 133 in adding operations, and a square stud 363, in the plate 347, in cooperation with a prominence on the lever 349, is adapted to disengage the #1 totalizer from the actuators 133 near the end of adding operation.

Upon operation of the machine, initial movement clockwise of the main shaft 57 and the totalizer engaging plate 347, as viewed in Fig. 13, moves the arcuate surface 346 out of the path of the shoe 345 to release the lever 338, link 337 and plate 333, to the action of the spring 335. However, when the traveling carriage is so positioned that the tappet 325 (Fig. 10) does not engage the upward extension 326 of the #1 hanging bar lever 327, the pawl 330 remains in the path of the shoulder 332 of the plate 333, as shown in Fig. 13, to obstruct counterclockwise movement of said plate, under influence of the spring 335. When the above condition prevails, initial movement clockwise of the plate 347 causes an upward extension 364 of the pawl 358 to engage the stud 336 to rock the extension 361 out of the path of the stud 362, thereby permitting the lever 349 to continue to pivot relatively to the plate 347 and consequently the #1 totalizer engaging mechanism does not function.

When the traveling carriage 46 (Figs. 10 and 18) is tabulated to the columnar position corresponding to the control block 305, the stop lug 304 on said block, in cooperation with the tabulating bars 300 and 311 (Figs. 26 and 27), positions the traveling carriage so that the tappet lug 325 engages the upward extension 326 of the lever 327, thus rocking said lever clockwise, as viewed in Fig. 10. Clockwise movement of the lever 327 (Fig. 13) raises the link 329 to rock the pawl 330 counter-clockwise out of the path of the shoulder 332. In this instance, when the arcuate surface 346 moves out of the path of the shoe 345, upon initial movement clockwise of the plate 347, the spring 335 rocks the plate 333, link 337 and lever 338 counter-clockwise to move the stud 336 out of the path of the extension 364.

Therefore, after the actuators 133 have been positioned by the depressed amount keys, and near the end of the initial movement clockwise of the plate 347 the extension 361 of the pawl 358 engages the stud 362. This terminates movement of the lever 349 in relation to the plate 347 and causes said lever to move in unison with said plate, which movement, by means of the link 351, rocks the arm 352, shaft 353 and cams 354 counter-clockwise. Counter-clockwise movement of the cams 354 by means of the slots 355 therein, in cooperation with the rollers 356, rocks the totalizer frame 357 clockwise to engage the wheels 189 of the #1 totalizer with the actuators 133. The #1 totalizer remains in engagement with the actuators 133 during their return movement forwardly, to add in said totalizer the amount set up on the keyboard.

After the actuators 133 have completed their return movement, and near the end of the return movement counter-clockwise of the plate 347, the stud 363 engages the lever 349, causing said lever to move counter-clockwise in unison with said plate 347, to rock the arm 352, shaft 353 and cams 354 clockwise to normal positions, as here shown, to disengage the wheels 189 of the #1 totalizer from the actuators 133. Return movement counter-clockwise of the plate 347 (Fig. 13) causes the arcuate surface 346, in cooperation with the sole of the shoe 345, to rock the lever 338, link 337, and plate 333 clockwise to normal positions, as here shown, to move the shoulder 332, on said plate, beyond the end of the pawl 330 so that said pawl may again move into the path of said shoulder to obstruct counter-clockwise movement of the plate 333.

Further explanation of the totalizer engaging mechanism may be had by referring to the Christion Patent No. 2,038,717.

Machine locking mechanism

Normally, the machine is locked against operation when the traveling carriage is out of columnar position, by mechanism which obstructs releasing movement of the plate 62 (Figs. 3, 10 and 18). When the traveling carriage is in the columnar position corresponding to the control block 305, a tappet lug 365 on said block, in cooperation with the upturned end of a hanging bar lever 366 free on the stud 328, rocks said lever clockwise, in the well known manner, to move the locking mechanism to ineffective position so that the machine may be operated. The above locking mechanism is fully disclosed in the Christian Patent No. 2,038,717, referred to above. Each of the control blocks, of which the block 305 is a representative, located in relation to the different columnar positions of the traveling carriage, has a tappet lug 365 (Fig. 18) which in cooperation with the lever 366 moves the locking means for the plate 62 to ineffective position.

*Automatic repeat mechanism*

Sometimes it is desirable to repeat-print certain items on one or more detachable portions of the record material, and this is accomplished by rendering the automatic releasing mechanism for the amount keys inoperative, so that the depressed amount keys will not be released at the end of machine operation, and therefore, upon subsequent operation of the machine the amount will be repeat-printed.

Tabulating the traveling carriage 46 (Figs. 10 and 18) to the column corresponding to the control block 305 causes a tappet lug 367, on said block, in cooperation with the upturned end 368 of a hanging bar lever 369, free on the stud 328, to rock said hanging bar lever clockwise, as viewed in Fig. 10. The left end of the lever 369 (Figs. 10 and 13) fits in a slot 394 in a link 370 the lower end of which is pivoted to the key release latch 118. Consequently clockwise movement of said lever 369 lifts the link 370 and rocks the latch 118 clockwise, as viewed in Fig. 13, to move and retain the hook 120 out of the path of the stud 121 during oscillation of the main shaft 57 and the key release disc 122. Obviously the depressed amount keys will not be released, near the end of machine operation, in the manner explained earlier herein, and consequently the amount set up on said keys will be repeat-printed in the succeeding operation of the machine. The slot 394 provides sufficient lost motion, between the lever 369 and the link 370, so that the hook 120 is free to move into the path of the stud 121, when the tappet 367 does not engage the extension 368 of the lever 369. The lever 369 is also connected by a link 340 (Fig. 10) to an add control pawl 341 for the #4 totalizer, which functions when the tappet lug 367 engages the lever 369, to condition the #4 totalizer for adding operations in exactly the same manner as described for the pawl 330, Fig. 13.

*Control keys*

The repeat-printing of amounts set up on the keyboard may also be effected by the depression of a repeat key 371 (Fig. 10), depression of which accomplishes the same results as the tappet lug 367, in cooperation with the lever 369. The mechanism connecting the repeat key 371 to the latch 118 is not here shown, but it is well known in the art and fully explained in the Ellis Patent No. 1,203,863, referred to hereinbefore.

The Nos. 1, 2, 3 and 4 totalizers are selected and conditioned for sub-total operations by means of their respective sub-total keys 372 to 375, inclusive, and a total operation may be performed in any one of the four totalizers by using a total key 376 in conjunction with the proper one of the sub-total keys 372 to 375 inclusive. This is the reverse of the usual condition in which the keys 372 to 375 are total keys and the key 376 is a sub-total key. It is believed that a description of a sub-total and a total operation, in connection with the #1 totalizer will be sufficient, as the mechanism and the manner in which it functions are substantially the same for each of the totalizers.

The repeat key 371, the sub-total keys 372 to 375 inclusive, and the total key 376, are mounted on the left side of the accounting machine keyboard in the same row and in substantially the same manner as the release key 125, explained earlier herein; that is, the lower ends of said keys extend through corresponding slots in the angle plate 127, and the upper ends of said keys extend through corresponding slots in the keyboard plate 126, and each of said keys has a spring similar to the spring 128 for the release key 125, which urges said keys upwardly to normally maintain a shoulder, formed on the upper end thereof, in contact with the lower surface of the plate 126.

Depressing the #1 sub-total key 372 (Fig. 13) moves a notch 377 therein opposite a bent-over ear 378 on a key latch lever 379 pivoted on a stud 380 in the frame 41, whereupon a spring 381 urges said lever clockwise to latch said key 372 depressed. Clockwise movement of the lever 379 causes a stud 382, in the lower end thereof, in cooperation with a camming surface 383 on a lever 384 free on a stud 385 in the frame 41 to rock said lever clockwise. Upon clockwise movement of the lever 384, an extension thereof, in cooperation with a stud 386 in a lever 387, also free on the stud 385, rocks said lever 387 clockwise in unison therewith. A spring 388 yieldingly connects the lever 387 to a totalizer engaging pawl 389, also free on the stud 385 and mounted adjacent said lever 387, said spring 388 normally maintaining said pawl in contact with a stud 390 in the lever 387. Also pivotally mounted on the lever 387 is a totalizer disengaging pawl 391, urged counter-clockwise by a spring 392 into engagement with a stop on said lever 387. Clockwise movement of the lever 387 moves the ends of the pawls 389 and 391 into the path of the lower end of the engaging lever 349, said lower end being reinforced by a block 393.

Upon operation of the machine, initial movement clockwise of the plate 347 (Fig. 13) causes the end of the lever 349 to engage the pawl 389 to rock the wheels 189 of the #1 totalizer into engagement with the actuators 133 in the manner explained hereinbefore. Initial movement rearwardly of the actuators 133 reversely rotates the wheels 189 to zero, to position said actuators and the printing sectors to the amount standing on said totalizer wheels. When the plate 347 nears the end of its initial movement, and after printing has been effected, mechanism presently to be described rocks the latch 379 counter-clockwise to disengage the ear 378 thereof, from the notch 377, to release the No. 1 sub-total key 372. This counter-clockwise restoring movement of the latch 379 permits the levers 384 and 387 to be returned, by gravity, counter-clockwise to normal positions to move the pawls 389 and 391 out of the path of the lower end 393 of the lever 349, so that the pawl 391 will not engage the lever 349 and disengage the wheels 189 from the actuators 133. As the wheels 189 remain in engagement with the actuators 133 during their return movement forwardly said wheels are returned to their original positions, to reenter the amount in the #1 totalizer, after which the stud 363, near the end of return movement of the plate 347, engages the lever 349 to disengage the wheels 189 from the actuators.

Depressing the total key 376 in conjunction with the #1 sub-total key 372 selects and conditions the #1 totalizer for a total operation, which is exactly like a sub-total operation, with the exception that the latch 379 is not rocked counter-clockwise to release the sub-total key 372, near the end of the initial movement of the plate 347. Consequently the pawl 391 remains in the path of the projection 393 and said projection by-passes said pawls during initial movement clockwise of the plate 347. Return movement counter-clockwise of the plate 347 causes the end of the lever 349 to engage the pawl 391 to rock the totalizer wheels 189 out of engagement with the actuators 133 prior to return movement forwardly of said actuators 133, thereby leaving the wheels 189 of the #1 totalizer in a zeroized condition. Near the end of machine operation the latch 379 is rocked counter-clockwise, in a manner presently to be described, to release the #1 sub-total key 372.

*Release of control keys*

Inasmuch as the time of release of the sub-total keys 372 to 375, inclusive, determines whether the operation is a sub-total or total operation, it is impossible to use the regular amount key releasing means, explained earlier herein, for releasing these keys, and therefore, a separate releasing mechanism has been provided for this purpose.

When the #1 sub-total key 372 (Fig. 13) is depressed, clockwise movement of the latch 379, under influence of the spring 381, causes the ear 378, in cooperation with a projection 399 of a key release bar 400, to shift said bar forwardly. The bar 400 is shiftably mounted by means of a slot, in the forward end thereof, in cooperation with a stud 401 in a foot-shaped lever 402 pivoted on a stud 403 in the frame 41, and by means of a slot 404 in the rearward end thereof, in cooperation with a stud 405 in the upper end of a lever 406 fulcrumed on a stud 407 in the frame 41. Mounted adjacent the bar 400 (Figs. 13 and 28) and somewhat similar in outline thereto, is an auxiliary release bar 408, the forward end of which is slotted to straddle an extension of the stud 401, and the rearward end of which is pivoted on an extension of the stud 405.

In sub-total operations, the total key 376 is not depressed, which causes the enlarged portion of a wedge 409, pivotally mounted on the stem of said key, to be positioned between studs 410 and 411 carried respectively by the bars 400 and 408, to connect said bars so that they will shift forwardly in unison, when the #1 sub-total key 372 is depressed. Forward shifting movement of the bar 408 rocks the lever 406 clockwise to move a footshaped portion 412 thereof into position to be engaged by an extension 413 of the stud 348 in the plate 347. Initial movement clockwise of the plate 347 engages the #1 totalizer wheels with the actuators 133, as explained above. Near the end of initial movement clockwise of the plate 347, and after printing has been effected, the extension 413 engages the foot 412 to rock the lever 406 counter-clockwise to shift the bars 408 and 400 rearwardly to rock the latch 379 counterclockwise to disengage the ear 378 thereof from the notch 377 to permit the key 372 to be spring-returned upwardly to undepressed position.

Return movement counter-clockwise of the latch 379 (Fig. 13) permits the lever 384 and the pawls 389 and 391 to rock counter-clockwise about their pivot 385 to move said pawl 391 out of the path of the lever 349. This permits the wheels 189 of the #1 totalizer to remain in engagement with the actuators 133 during their return movement forwardly, to return said wheels to their original positions, to reenter therein the amount of the sub-total. At the beginning of return movement counter-clockwise of the plate 347, the extension 413 is withdrawn from the foot 412 and the spring 381 returns the latch 379 and connected parts clockwise until the ear 378 comes to rest on the edge of the stem of the key 372, as shown in Fig. 13. Near the end of return movement counter-clockwise of the plate 347 the stud 363 engages the lever 349 and disengages the #1 totalizer wheels 189 from the actuators 133.

If it is desired to perform a total operation in the #1 totalizer, the total key 376 is depressed in conjunction with the #1 sub-total key 372. Depressing the total key 376 (Figs. 13 and 28) moves a notch 414 therein opposite a bent-over ear 415 of a latch 416, pivoted on a stud 417 in the frame 41, whereupon a spring 418 urges said latch 416 clockwise to engage the ear 415 with the notch to retain the total key depressed. Depressing the total key 376 carries the wedge 409 downwardly in unison therewith to move the enlarged portion thereof from between the studs 410 and 411, to disconnect the bar 400 from the bar 408. An upwardly extending finger of the wedge 409, in cooperation with the studs 410 and 411, retains said wedge in proper relationship with said studs.

It is, therefore, evident that when the extension 413 of the stud 348 (Fig. 13) in cooperation with the lever 406, shifts the bar 408 rearwardly, during initial movement of the plate 347, no movement will be imparted to the bar 400; consequently the latch 379 will remain in its clockwise position to retain the #1 sub-total key 372 depressed and to retain the pawls 389 and 391 in the path of the lever 349.

Initial movement clockwise of the plate 347 (Fig. 13) causes a stud 1418 carried thereby to by-pass the lower end of a lever 419, pivotally mounted on the bar 400, said lever being yieldingly retained in a neutral position by a spring 420. At the beginning of the return movement counter-clockwise of the plate 347, the lower end 393 of the lever 349 engages the pawl 391 to rock the #1 totalizer wheels 189 out of engagement with the actuators 133, before said actuators start their return movement forwardly, thereby leaving said wheels in a zeroized condition. Continued counter-clockwise movement of the plate 347 causes the stud 418 to engage the lower end of the lever 419 to rock said lever clockwise until a surface 421, on the upper end thereof, contacts a stud 422 in the frame 41, whereupon continued clockwise movement of said lever shifts the bar 400 rearwardly. Rearward movement of the bar 400 causes the projection 399 thereon to rock the latch 379 counter-clockwise to disengage the ear 378 from the notch 377 in the key 372 to permit said key to be spring-returned upwardly to undepressed position and to permit the pawls 389 and 391 to be returned counter-clockwise out of the path of the lever 349 to normal position, as shown in Fig. 13. When the stud 418 moves beyond the lower end of the lever 419 the spring 381 returns the latch 379 clockwise until the ear 378 comes to rest on the edge of the key 372.

The total key 376 (Fig. 13) is released just after the No. 1 sub-total key 372 in the following manner: Initial movement clockwise of the main shaft 57, the plate 347, and the disc 122, causes the stud 121 in said disc to by-pass the angular nose of a spring-pulled tappet 423, free on a stud 424 in the frame 41. Return movement counter-clockwise of the disc 122 causes the stud 121 to rock the tappet 423 clockwise, whereupon a stud 425, carried by said tappet, in cooperation with an angular surface 426 on an arm 427 internal with the latch 416, rocks said latch counter-clockwise to disengage the ear 415 from the notch 414 to permit the total key 376 to be spring-returned upwardly to undepressed position, as here shown. After the stud 121 moves beyond the tappet 423, the spring 418 returns the latch 416 and the arm 427 clockwise until the ear 415 comes to rest on the edge of said key 376.

It should be remembered that in both total and sub-total operations the pawl 389, (Fig. 13), in cooperation with the lower end of the lever 349, engages the wheels 189 of the #1 totalizer with the actuators 133 prior to the initial movement rearwardly of said actuators. Likewise it should be remembered that the sub-total keys 373, 374 and 375, have mechanism similar to and functioning in substantially the same manner as the sub-total key 372 to control their respective totalizers.

Automatic control of totalizer selection and machine operation

In order to expedite the handling of certain complex business systems it is desirable to have the machine cycle automatically through several operations to print the desired data upon the various portions of the statement or record sheet. The automatic operation of the machine is effected by mechanism under the control of the traveling carriage, when in certain columnar positions. The traveling carriage also tabulates automatically, from column to column, during automatic machine operation.

During automatic machine operation, mechanism controlled by the traveling carriage causes amounts set up on the keyboard, in a previous adding operation, to be repeat printed, and also causes certain of the totalizers to be selected and conditioned for total or sub-total operations. In the present adaptation the #1 and #3 totalizers are arranged to be selected for sub-total and total operations during automatic machine operation. However, this is merely a matter of choice, as any or all of the totalizers may be arranged for such automatic selection.

Referring to Fig. 18, adjustably mounted on the bar 274 are control blocks 428, 429 and 430 for controlling operation of the machine to record the desired data in the different columns of the record material, corresponding to these control blocks. Secured to the control block 429 (Figs. 2 and 18) is a bracket 431, which supports a camming tappet 432, which when the traveling carriage is tabulated to the column corresponding to the control block 429, in cooperation with the upturned end 433 (Fig. 10) of a lever 434 pivoted on a stud 435 secured in the machine case 45, rocks said lever counter-clockwise as here viewed. Counter-clockwise movement of the lever 434 lifts a link 436, pivotally connecting said lever 434 to one arm of a yoke 437 (Figs. 3, 4, 10 and 15) rotatably mounted on a rod 438 supported by bent-over portions of a hanger 439, free on a rod 445 supported by bent-over portions of a bracket 446 secured to the machine base 44.

Lifting of the link 436 rocks the yoke 437 counter-clockwise, as viewed in Fig. 3 and clockwise as viewed in Fig. 15, to latch a hook-shaped portion 447 thereof over a flattened stud 448 in a crank 449 secured on a shaft 450, one end of which is journaled in a bent-over portion of the bracket 446 and the other end in a similar bracket 451 (Fig. 13) secured to the machine base 44. Also secured on the shaft 450 (Figs. 13 and 15) is a plate 452, carrying an adjustable eccentric 453, which in cooperation with a slot in a plate 454, adjacent said plate 452, forms an adjustable connection between said plates. The plate 454 carries a flattened stud 455, which is engaged by a notch in the lower end of the stem of the #1 sub-total key 372.

Upon operation of the machine, mechanism presently to be described, shifts the hanger 439 (Fig. 3), the rod 438 and the yoke 437 rearwardly, causing the hook 447, in cooperation with the stud 448, to rock the crank 449, shaft 450 and plates 452 and 454 clockwise, as viewed in Fig. 15, thereby causing the stud 455 to depress the #1 sub-total key 372 to cause a sub-total operation to be performed in the #1 totalizer.

In the present machine, mechanism similar to that described for the #1 sub-total key 372 is also provided for automatically depressing the #3 sub-total key 374 (Fig. 13), for the consecutive number accumulator, when the traveling carriage is tabulated to certain columnar positions. This mechanism will be described, in detail, later.

Mechanism is also provided for automatically depressing the total key 376 (Fig. 13), which when depressed, in conjunction with the #1 sub-total key 372, causes a total operation to be performed in the #1 totalizer. When the traveling carriage 46 (Figs. 2 and 18) is tabulated to the columnar position corresponding to the control block 429, a camming tappet 456, mounted adjacent the tappet 432, in cooperation with the upturned end 457 (Fig. 10) of a hanging bar lever 458, free on the stud 435, rocks said lever counter-clockwise as here viewed. A hanging bar or link 459, which pivotally connects the lever 458 to an arm of a yoke 460 (Figs. 3, 10 and 14) free on the rod 438, causes counter-clockwise movement of said lever 458 to rock said yoke 460 counter-clockwise, as viewed in Fig. 3, and clockwise as viewed in Fig. 14, to latch a hook 461, on a forwardly extending arm of said yoke, over a flattened stud 462 in a crank 463 secured on the right-hand end of a shaft 464, journaled in the brackets 446 and 451. Secured on the left-hand end of the shaft 464 is a crank 465 connected by a link 466 to a plate 467 free on a stud 468 in the bracket 451. The plate 467 carries an adjustable eccentric 469, which in cooperation with a slot in a companion plate 470, also free on the stud 468 and mounted adjacent said plate 467, forms an adjustable connection between said companion plates.

Automatic operation of the machine (Figs. 3 and 14) causes the hanger 439, rod 438 and yoke 460 to be shifted rearwardly to rock the shaft 464 clockwise, as viewed in Figs. 13 and 14, which movement is transmitted to the plates 467 and 470 by the crank 465 and link 466. Clockwise movement of the plate 470, by means of a stud 471 therein, in cooperation with a notch in the lower end of the stem of the total key 376, depresses said total key to cause a total operation to be performed in the totalizer selected by the depressed sub-total key, which in the present instance is the #1 sub-total key 372.

Obviously, it is merely a matter of assembly to supply any or all of the sub-total keys with the automatic depressing mechanism, explained in connection with the #1 sub-total key. However, in the present adaptation, this is neither necessary nor desirable.

As previously explained, the #3 totalizer is used for accumulating a consecutive number, and as it is necessary to print this consecutive number upon several different portions of the statement or record sheet, each of the columnar control blocks 428, 429 and 430 (Fig. 18) has a camming tappet 472, similar to the tappets 432 and 456, mounted on their respective brackets 473, 431 and 474.

When the traveling carriage 46 is in a columnar position corresponding to one of the tappets 472, said tappet, in cooperation with an upturned end 475 (Figs. 3, 10 and 18) of a hanging bar lever 476 free on the stud 435, rocks said hanging bar lever counter-clockwise. A hanging bar or link 477 pivotally connects the hanging bar lever 476 to one arm of a yoke 478 (see also Fig. 4) free on the rod 438 and therefore, lifting of said bar 477 rocks the yoke 478 counter-clockwise, as viewed in Fig. 3. Counter-clockwise movement of the yoke 478 causes a hook 479, on a forwardly extending arm thereof, to latch over a stud 480 in a crank 481 secured on the right-hand end of a shaft 482 journaled in the brackets 446 and 451. Secured on the left-hand end of the shaft 482 (Fig. 13) is a plate 483 carrying an eccentric 484, which in cooperation with a slot in a companion plate 485, free on the shaft 482, forms an adjustable connection between said plate and the plate 483, similar in every respect to the adjustable connection between the companion plates 452 and 454 (Fig. 15) explained earlier herein. The plates 485 (Figs. 10 and 13) carries a stud 486, which is engaged by a notch in the lower end of the #3 sub-total key 374.

Upon operation of the machine, the yoke 478 is shifted rearwardly, rocking the shaft 482 counter-clockwise, as viewed in Fig. 3 and clockwise as viewed in Figs. 10 and 13, to depress the #3 sub-total key 374 to select and condition the #3 or consecutive number totalizer for a sub-total operation.

Obviously the #3 totalizer may be automatically totalized by arranging one of the tappets 456 (Figs. 2 and 18) adjacent one of the tappets 472, thus causing both the "total" key 376 (Fig. 10) and the #3 "sub-total" key 374 to be simultaneously depressed.

*Automatic initiation of machine operation*

Mechanism operating in conjunction with the mechanism described above, for automatically selecting and conditioning the #1 and #3 totalizers for total and sub-total operations, is provided for automatically initiating machine operation, said mechanisms together constituting means whereby any predetermined number of total or sub-total operations may be performed automatically.

Referring to Fig. 18, the bracket 473, on the control block 428, supports a flexible tappet 487 and the bracket 431 (Figs. 2 and 18) on the control block 429 supports two flexible tappets 488 and 489, for automatically initiating machine operation, when the traveling carriage is stopped in a columnar position, corresponding to one of said tappets, while said carriage is traveling in its tabulating or working direction. Using the tappet 488 (Fig. 2) as an example of all the tappets, said tappet is pivotally mounted on a stud 490 in the bracket 431 and a torsion spring 491 urges said tappet counter-clockwise to normally maintain an extension thereof in contact with a stop stud 492, also in the bracket 431.

When the traveling carriage 46 (Fig. 18) is tabulated to a columnar position corresponding to the tappet 488, said tappet, in cooperation with an upturned end 498 of a hanging bar lever 499, free on the stud 435, rocks said hanging bar lever counter-clockwise as here viewed. Counter-clockwise movement of the hanging bar lever 499 lifts a link 500 pivotally connecting said lever to an arm 501 (Figs. 3, 4, and 5) of a yoke 502, free on the rod 438, and said link in turn rocks said yoke 502 counter-clockwise, as viewed in Figs. 3 and 5. An arm 503 of the yoke 502 (Figs. 3, 5 and 10) has pivotally connected thereto a link 504 urged clockwise as viewed in Fig. 5, and counter-clockwise, as viewed in Fig. 10, by a spring 505, to normally maintain a protruding surface thereon in contact with a similar surface on the arm 503. Pivotally connected to the link 504 is a lever 506 having a camming slot 507 therein, which encircles a fixed stud 508 in the motor frame 47.

Counter-clockwise movement of the yoke 502, as viewed in Figs. 3 and 5, shifts the lever 506 upwardly, causing the cam slot 507 therein, in cooperation with the stud 508, to move a roller 509, mounted on the lower end of said lever 506, rearwardly into the path of a camming segment 510 secured on the periphery of the clutch driving member 50, which it will be recalled, is continuously rotated in a counter-clockwise direction (Fig. 3) by the motor 39. During rotation of the clutch member 50 the camming segment 510 engages the roller 509 to rock the lever 506 clockwise, as viewed in Figs. 3 and 5, on the pivot formed by the stud 508 and the slot 507. The spring 505 (Fig. 10) is strong enough to overcome the action of a spring 511 (Figs. 3 and 5), which normally retains the hanger 439 in its forward position, which is determined by the rod 438 engaging a depending finger 512 of the bracket 446. Consequently, clockwise movement of the lever 506 shifts the yoke 502 and the hanger 439 rearwardly or counter-clockwise, as here viewed. The yokes 437, 460, 478 and 502 (Figs. 3 and 4) are nested together on the rod 438, and therefore move rearwardly in unison with the hanger 439. When any of the yokes 437, 460 or 478 have been rocked counter-clockwise, as viewed in Fig. 3, or clockwise as viewed in Figs. 14 and 15, by the camming lugs located in relation to columnar positions of the traveling carriage and explained earlier herein, to engage their respective hooks 447, 461 or 479 with their respective studs 448, 462 or 480, rearward movement of the yoke assembly causes the respective keys 372, 376 or 374 (Fig. 13) to be depressed in the manner explained previously.

An extension 513 of the hanger 439 (Figs. 3, 5 and 10) has pivotally connected thereto the lower end of a link 514, said link extending through an opening in the bracket 446 and having a slot 515, in the upper end thereof, which embraces a stud 516 in a crank 517 secured on the right-hand end of a shaft 518, journaled in the frames 40 and 41. The upper end of the crank 517 is bifurcated to straddle a stud 519 in the plate 62. Therefore, when the lever 506 rocks the yoke 502 and hanger 439 rearwardly or counter-clockwise, as viewed in Fig. 3, the link 514, in cooperation with the stud 516 and crank 517, rocks the plate 62 counter-clockwise, against the action of the spring 86, to initiate operation of the machine, in the manner explained near the beginning of this specification.

When machine operation is initiated by depressing the starting bar 58, counter-clockwise movement of the plate 62, under influence thereof, causes the stud 516 to ride idly in the slot 515 without transmitting movement to the link 514 and connected mechanism. In case the plate 62 (Fig. 3) is held against counter-clockwise releasing movement, by the well known starting bar locking mechanism, the spring 505 (Fig. 10) forms a flexible connection between the lever 506 and the link 504, which permits said parts to move independently of the yoke 502 to prevent injury to the mechanism.

When the camming segment 510 (Fig. 3) moves beyond the roller 509, the spring 511 returns the yoke 502 and hanger 439 forwardly to normal positions. Inasmuch as the traveling carriage is automatically tabulated prior to the end of machine operation, the hanging bar lever 499, bar 500, and connected parts (Figs. 3, 5 and 10) are returned, by gravity, to normal positions, as here shown, before the camming segment 510 can make a second revolution, thereby preventing another repeat operation of the machine.

While the feature is not used, the present machine embodies all the necessary mechanism for the automatic transferring of totals. For example, the #1 totalizer may be automatically sub-totalized or totalized, by the mechanism shown principally in Fig. 10, and the total thus obtained may be simultaneously and automatically transferred to the #2 or #4 totalizers by selecting and conditioning said totalizers for addition by means of tappet lugs on the control blocks in cooperation with the well known hanging bar lever mechanism. Or the #3 totalizer may be automatically sub-totalized or totalized, by the mechanism shown in Fig. 10, and the total thus obtained may be simultaneously and automatically transferred to the #1 totalizer by selecting and conditioning this totalizer for addition by means of the hanging bar lever mechanism shown principally in Fig. 13 and explained above.

Thus is disclosed a fully automatic transfer total mechanism under the complete control of the traveling carriage, when same is in predetermined columnar positions.

In addition to the tappets 487, 488 and 489, (Fig. 18) mechanism, actuated by depression of the vertical feed bar 99 or the auxiliary starting bar 100 (Fig. 3), lifts the bar 500 to cause the automatic total and sub-total mechanism to function automatically, when the traveling carriage is in certain columnar positions.

The upper end of the stem of the vertical feed starting bar 99 (Figs. 3, 7 and 9) extends through an opening in the auxiliary keyboard plate 61, while the lower end of said stem has a slot 520 therein which cooperates with a stud 521 in an extension of the lever 65, said slot and said stud merely forming an anchor for the lower end of the stem of the bar 99, otherwise there is no cooperation whatever between the bar 99 and the lever 65. A stud 522 (Figs. 3, 7 and 9), which extends through an opening 523 in a plate 524, mounted on the stud 66 and studs 525 and 526 in the frame 40, connects the stem of the starting bar 99 to a pitman 527 (see also Fig. 29). The pitman 527 is mounted for angular sliding movement by means of parallel slots 528 and 529 therein, in cooperation with studs 530 and 531 in the plate 524. A spring 532 tensioned between the stud 530 and a stud 533, in the pitman 527, urges said pitman and the starting bar 99 upwardly to normally maintain a shoulder 534, on the stem of said starting bar, in contact with the lower surface of the plate 61.

Depressing the vertical feed starting bar 99 shifts the pitman 527 downwardly against the action of the spring 532, to move a notch 535 in said pitman opposite a bent-over ear 536 on a latch 537 free on the stud 531, whereupon a spring 538 urges said latch 537 clockwise to engage the ear 536 with the notch 535, to latch the starting bar 99 in depressed position. Clockwise movement of the latch 537 causes a stud 539 carried thereby, in cooperation with a projection 540 of a lever 541, free on the stud 66, to rock said lever 541 counterclockwise, against the action of a spring 542, which is weak enough to be overcome by the spring 538. Counter-clockwise movement of the lever 541 causes an extension 548 thereof in cooperation with a companion extension 549 of the bar 500 (Figs. 3, 5 and 7) to raise said bar to rock the yoke 502 counter-clockwise to move the roller 509 into the path of the camming segment 510, in the manner explained above. The segment 510, in cooperation with the roller 509, shifts the yoke 502 and hanger 439 rearwardly to cause a total or a sub-total operation to be performed in the totalizer selected by the camming tappets on the control blocks, located in relation to the various columnar positions of the traveling carriage 46 (Fig. 18).

Counter-clockwise movement of the lever 541, (Figs. 3 and 7) when the vertical feed starting bar 99 is depressed, moves a foot 550, pivotally mounted thereon and urged counter-clockwise by a spring 551, into the path of a stud 552 on one arm of a bell crank 553 secured on the main shaft 57. Initial movement counter-clockwise of the main shaft 57 causes the stud 552 to by-pass the foot 550, and upon return movement clockwise of said shaft and said bell crank, the stud 552 engages the sole of the foot 550 to return the lever 541 clockwise. Clockwise return movement of the lever 541 causes the projection 540, in cooperation with the stud 539, to rock the latch 537 counter-clockwise to disengage the ear 536 from the notch 535 to permit the spring 532 to return the pitman 527 and the vertical feed starting bar 99 upwardly to normal positions as here shown. When the stud 552 moves beyond the sole of the foot 550 the ear 536 comes to rest on the edge of the pitman 527.

Mechanism associated with the auxiliary starting bar 100 (Fig. 7), said mechanism including a latch 554, with a stud 555, which cooperates with an extension 556 of the lever 541, cooperates with said lever to control the automatic total and sub-total mechanism in exactly the same manner as explained for the vertical feed starting bar 99.

*Non-repeat mechanism*

The vertical feed starting bar 99 (Figs. 3 and 7) is provided with mechanism to prevent repeat operations of the machine, when said bar is inadvertently retained in depressed position at the end of machine operation.

Pivotally mounted on the stud 533 (Fig. 7) in the pitman 527, is a non-repeat plate 557 urged clockwise by a spring 558 to position a hump 559 thereon adjacent the notch 535 in the pitman 527, and to normally maintain a bent-over ear 560 thereof in engagement with a slot 561 in a nonrepeat pawl 562. The nonrepeat pawl 562 is pivotally mounted on a stud 563 in the plate 524 and a spring 564 urges said pawl clockwise into engagement with a stop stud 565 in said plate 524.

When the vertical feed starting bar 99 (Fig. 7) is in undepressed position, as here shown, an abutting surface 566 of the pawl 562 is in the path of the bent-over ear 536 of the latch 537. Depressing the starting bar 99 causes the ear 560 of the plate 557 to engage the bottom of the slot 561 to move the pawl 562 downwardly in unison therewith to move the surface 566 beneath the ear 536. When the starting bar 99 is fully depressed, the spring 538 rocks the latch 537 clockwise to engage the ear 536 with the notch 535, whereupon said ear, in cooperation with the hump 559, rocks the plate 557 counter-clockwise to disengage the ear 560 from the notch 561, in the pawl 562. When the ear 560 is disengaged from the notch 561 the pawl 562 is spring-returned upwardly, a slight distance, until a top surface 567 thereon contacts the bottom of the ear 536, and this return movement of said pawl moves a surface 568 thereon into the path of the ear 560.

In case the vertical feed starting bar 99 is retained depressed, at the end of machine operation, return movement counter-clockwise of the latch 537, under influence of the lever 541, disengages the ear 536 from the notch 535 and permits the plate 557 to be spring-returned clockwise, until the ear 560 comes to rest on the surface 568. When the latch 537 is fully returned to disengaged position, the ear 536 is moved beyond the abutment 566, permitting the spring 564 to return the pawl 562 upwardly into contact with the stop stud 565. This moves the abutment 566 into the path of the ear 536 to obstruct releasing movement clockwise of the latch 537 when the stud 552 rides off the sole of the foot 550. The functioning of the above mechanism prevents a repeat operation of the machine, and it is impossible to operate the machine until the vertical feed starting bar 99 is released and is spring-returned upwardly so that the ear 560 will reengage the notch 561, in order that the pawl 562 may be rocked out of the path of the ear 536 upon subsequent depression of the vertical feed starting bar 99.

A similar non-repeat device is provided for the auxiliary starting bar 100 (Fig. 7), and as this mechanism functions exactly like the nonrepeat mechanism just described, it is believed unnecessary to make further mention of said mechanism.

The machine embodying the present invention is provided with the traveling carriage return mechanism disclosed in the United States Patent #2,082,098, issued June 1, 1937, to R. A. Christian. This mechanism comprises three touch bars for returning the traveling carriage from tabulated positions to predetermined columnar positions. These three return bars are used in the system of operation later to be described, but otherwise they have no important bearing upon the mechanism of this invention, and therefore it is believed unnecessary to give a detailed description thereof at this time.

Lock for total key

Means is provided for rendering the total key 376 (Figs. 11, 12 and 13) inaccessible to unauthorized persons. This means includes a housing 569 having mounted therein a lock 570, the bar 571 of which is operated by a key 572. The housing 569 supports two studs 573 which engage holes in two upturned ears of a bracket 574 secured to the keyboard plate 126. When the housing 569 is locked in place, a notch in the end of the bar 571 engages a T-shaped upward extension 575 of the bracket 574. Turning the key 572 withdraws the bar 571 from the extension 575, after which said housing may be shifted toward the left, to disengage the studs 573 from the holes in the bracket 574 and then said housing 569 may be removed from over the total key 376, thus rendering said key accessible. The housing 569 is replaced by reversal of the process outlined above.

Control of automatic cycling

At times it is desirable not to have the machine cycle automatically when the traveling carriage is in certain columnar positions, and to this end mechanism illustrated in Figs. 2 and 18 is provided for moving the tappet 488 to ineffective position and retaining said tappet in such position. Such mechanism includes a plate 590 (Fig. 2) mounted for vertical sliding movement, on the bracket 431, by means of a slot therein in cooperation with two studs 591 in said bracket. The plate 590 is shiftable to two positions, which are determined by two notches in one edge thereof, in cooperation with a retaining pawl 592 pivotally mounted on the bracket 431 and urged into cooperation with said notches by a torsion spring 593. A stud 594, secured in the plate 590, provides a fingerpiece for shifting said plate from one position to the other, and a tenon of said stud, in cooperation with a projection 595 of the tappet 488, rocks said tappet clockwise, to ineffective position, when the plate 590 is shifted from the position here shown to its lower position. This moves the tappet 488 out of the path of the upturned end 498 (Fig. 18) of the hanging bar lever 499 with the result that the automatic operating or cycling mechanism is rendered ineffective.

Again referring to Fig. 18, mechanism, operated when the traveling carriage is returned to initial position, rocks the tappet 487 to ineffective position to prevent automatic operation of the machine until after certain data has been typewritten upon the record material. After the data has been typewritten, depressing the typewriter tabulating bar 246 causes the tappet 487 to be restored to effective position.

The slide 273 (Fig. 18) has connected thereto one end of a link 576, a hook-shaped slot in the other end of which engages a stud 577 in the bracket 473, said stud forming a pivot for the tappet 487. A stud 578 in the link 576 cooperates with an angular surface on the tappet 487 to move said tappet to ineffective position in a manner presently to be described. A link 579 connects the slide 273 to a similar slide 580 mounted on the bar 274, said link 579 being strengthened and supported, near its center, by a slotted stud 581, in the bar 274. It is, therefore, obvious that the link 579 connects the slides 273 and 580 for unitary sliding movement, which movement is determined by the control block 305 in cooperation with the slide 273, and by a stop block 582, mounted on the bar 274, in cooperation with the slide 580.

When the traveling carriage is returned to initial position, a lug 583 on the slide 580 contacts the upper end 271 of the bar 268 and shifts the slides 580 and 273 toward the left until said slide 580 contacts the block 582, as here shown. This causes the stud 578 in cooperation with the edge of the tappet 487, to rock said tappet clockwise, against the action of its spring, which normally maintains an extension of said tappet in contact with a stop stud 584, to ineffective position, as here shown. After the desired data has been typed upon the record material, depressing the typewriter tabulating bar 246 (Figs. 10 and 18) disengages the escapement mechanism and raises the upper end 271, of the bar 268, into the path of the stopping lug 272 on the slide 273. This causes the slides 273 and 580 to shift to the right until said slide 273 contacts the block 305 to terminate tabulating movement of the traveling carriage and to move the stud 578 toward the right to permit the tappet 487 to be spring-returned counterclockwise into cooperative relationship with the upper end 498 of the hanging bar lever 499.

An example of the use of the above disabling mechanism will be explained in connection with the description of the mode of operation, to be given near the end of this specification.

*Carriage control and inking ribbon*

Mechanism controlled by the traveling carriage, in certain predetermined columnar positions thereof, is provided for shifting the two-color inking ribbon 176 from its normal black printing position to red printing position, to record certain items in a distinctive color.

Referring to Fig. 21, the inking ribbon 176 is threaded through split loops formed on the upper ends of the prongs of a ribbon shifting fork 585, each of said prongs having a bent-over ear 586 which, in cooperation with their respective uprights 587, secured to the top plate 588 of the printer assembly, guides said ribbon shifting fork in its up-and-down movement. The prongs of the ribbon shifting forks 585 straddle the printing sectors 154 for the accounting machine, and guides the inking ribbon between said sectors and the record material supported by the platen roll 177, so that data may be recorded on said record material.

The regular typewriter ribbon vibrating mechanism is employed for moving a section of the ribbon 176 into cooperative relationship with the typewriter type and the record material.

The lower end of the fork 585 has formed thereon two similar ears 589 having coinciding slots which embrace tenons formed on each end of a stud 640 secured in one end of a lever 596 fulcrumed at 597 to the ribbon framework 43 (Fig. 1). The other end of the lever 596 is connected by a link 598 to an arm of a yoke 599, pivoted between trunnions 600 supported by the frame 43. A downwardly extending arm of the yoke 599 carries a stud 601 which engages a slot in the rearward end of a link 602, the forward end of which is pivotally connected to the arm 603 secured on the printer shaft 156. A spring 604, tensioned between the link 602 and the stud 601, forms a resilient connection between said link and the yoke 599 and normally maintains the stud 601 in engagement with the forward end of the slot in said link 602. One arm of the yoke 599 (Figs. 19, 20 and 21) carries a stud 605 which cooperates with a hook 606, pivoted at 607 to a bracket 608 secured by screws 609 to an angular surface on an extension of the frame 43.

The hook 606 is adjusted in relation to the stud 605 by means of an eccentric 610 in cooperation with a slot in the bracket 608, said eccentric having a tenon 611, upon which is turnably mounted a companion eccentric 612 (Figs. 19 and 20), which, in cooperation with a slot in a bracket 613, provides means for adjusting a shoulder 614 of said bracket in relation to the stud 605. A bent-over portion of the bracket 613 underlies the bracket 608 and the screws 609 are also used to secure said bracket 613 in place. The tenon 611 (Fig. 19) extends through a boring in the extension of the frame 43 and is threaded to receive a nut, by means of which the eccentrics 610 and 612 are secured in adjusted positions. The hook 606 has a prong 615 (Figs. 20 and 21) which cooperates with a stud 616 in a crank 617 secured on a shaft 618 journaled in an extension of the frame 43 and a boring in the tenon 611 of the eccentric 610. A spring 619, tensioned between the hook 606 and the stud 616, urges said hook clockwise to normally maintain the prong 615 in engagement with said stud 616.

Normally the shaft 618 (Figs. 20 and 21) and the crank 617 are in the positions here shown, to hold the hook 606 in the path of the stud 605. Initial movement clockwise of the shaft 156, effected by the mechanism shown in Fig. 3 and explained hereinbefore, by means of the link 602 and spring 604, rocks the yoke 599 clockwise, said yoke, by means of the link 598, also rocking the lever 596 clockwise in unison therewith, to shift the ribbon fork 585 upwardly. Upward movement of the fork 585 is terminated by the stud 605, in the yoke 599, contacting the hook 606, after which the arm 603 and link 602 complete their initial movement, independently of said yoke 599, flexing the spring 604. This moves the upper or black portion of the two-color inking ribbon 176 opposite the printing line, and when the printing sectors 154 are released for printing movement, the data set up thereon will be printed in black upon the record material.

Manual means (not here shown but well known in the art) is provided for shifting the shaft 618 (Fig. 21) and the crank 617 clockwise to cause the stud 616, in cooperation with the prong 615, to rock the hook 606 counter-clockwise out of the path of the stud 605. In this latter instance, initial movement clockwise of the shaft 156 and the arm 603 rocks the yoke 599 clockwise, in unison therewith, until the stud 605 contacts the shoulder 614, to raise the fork 585 higher than in the first instance to move the lower or red portion of the inking ribbon 176 opposite the printing line, so that data will be printed in red upon the record material. Return movement counter-clockwise of the shaft 156 and arm 603 returns the fork 685 and the ribbon 176 downwardly to a position below the printing line, as shown in Fig. 21, so that the data printed upon the record material will be visible.

In addition to the manual means for causing the inking ribbon to be raised to red printing position automatic means, controlled by the traveling carriage in certain predetermined columnar positions thereof, is also provided for causing said ribbon to be lifted or raised to red printing position.

When the traveling carriage 46 (Fig. 18) is tabulated to a columnar position corresponding to the control block 430, a tappet lug 620 thereon, in cooperation with the upturned end 621 of a hanging bar lever 622, rocks said lever clockwise on its pivot 328. Clockwise movement of the lever 622 causes a slot in a right-hand extension 623 thereof, in cooperation with a finger 624 secured on one end of a shaft 625 journaled in the case 45 (Fig. 21) to rock said shaft counter-clockwise as viewed in Fig. 18. Counter-clockwise movement of the shaft 625 causes a camming surface 626 (Fig. 21) on an arm 627 secured thereon, in cooperation with a stud 628 on a spring-actuated bar 629 slidably mounted on the plate 588, to shift said bar 629 rearwardly. Rearward movement of the bar 629 (Figs. 20 and 21) causes a finger 630 thereof, in cooperation with a stud 631 in the hook 606, to rock said hook counter-clockwise out of the path of the stud 605, to cause the inking ribbon 176 to be raised to its highest position where the red portion thereof is opposite the printing line, so that data will be recorded in a distinctive color, in this particular column of the record material. A spring 1630 normally maintains the stud 628 in contact with the camming surface 628, and also provides a means to restore the bar 629 when the arm 627 is restored to its normal position.

*Consecutive number mechanism*

As previously explained, the #3 totalizer (Figs. 1 and 6) is reserved for the accumulation of a consecutive number which is printed on the various detachable portions of the record slips. In the present arrangement, mechanism, functioning when the #4 totalizer is selected for an adding operation, causes the units wheel, of the consecutive number accumulator, to be advanced one digit. As herein illustrated, the #4 totalizer is selected for addition only once during the series of operations required to complete a record slip. It is therefore evident that the consecutive number accumulator will be advanced only one digit during said series of operations. Other operations performed in the #4 totalizer, for example, sub-total and total operations, have no effect upon the advancing mechanism for the consecutive number accumulator. In the present adaptation, in order to have the consecutive number print adjacent the date, only the four higher order wheels 196 have been utilized for the accumulation of the consecutive number.

The #3 totalizer shaft (Fig. 8), which supports the consecutive number wheels 196, is mounted in a rockable frame 632, similar to and functioning in exactly the same manner as the frame 357 (Fig. 13) for the #1 totalizer, explained earlier herein. The frame 632 is pivoted on trunnions supported by the frame 188 (Fig. 6) and the extreme right and left arms of said frame 632 each support a roller 633 (only one here shown) which project into respective cam slots 634 in two engaging cams 635 secured on an engaging shaft 636 journaled in the framework 188. A flying lever mechanism and its totalizer engaging pawl, similar to that illustrated in Fig. 13 for the #1 totalizer, and explained earlier herein, controls the engaging shaft 636 for the consecutive number accumulator, to engage and disengage the wheels 196 (Figs. 1 and 8) with the extensions 198 of the actuators 133 in total or sub-total timing.

The consecutive number accumulator is not provided with an add hanging bar lever and associated mechanism for selecting and conditioning said accumulator for adding operations, but instead is provided with a step-by-step advancing mechanism now to be described.

A trip pawl 637 (Fig. 8), for the units consecutive number wheels 196, is pivoted on a rod 638 supported by the framework 632 and said trip pawl is urged counter-clockwise by a spring 639, to normally engage a rod 645 supported by the frame 632. A bent-over ear 646 of the pawl 637 normally engages a shoulder 647, on a cam lever 648 pivoted on a rod 649 supported by a plate 644 supported by the framework 188 (Fig. 6), to normally restrain said lever 648 against the action of a spring 650, which is tensioned to urge said lever counter-clockwise. The lever 648 has a cam slot 651 into which extends a stud 652 in a carry segment 653 pivoted at 654 to plate 644. Gear teeth in the segment 653 (Fig. 8) mesh with the teeth of the units consecutive number wheel 196, when the consecutive number accumulator is out of engagement with the actuator extension 198, as here shown.

The pawl 637 has a shoulder 655, which cooperates with a finger 656 integral with a shaft 657 journaled in the framework 188. Secured on the right-hand end of the shaft 657 (Fig. 6) is an arm 658, said arm and said shaft urged clockwise by a spring 659, to normally maintain a shoulder on said arm, in contact with a stop stud 660 in the frame 188. The arm 658 carries a stud 661, which cooperates with the upper end of a pawl 662 pivotally mounted on the upper end of a pitman 663, the lower end of which is pivoted to a crank 664 on the right-hand end of a #4 totalizer engaging shaft 665 journaled in the framework 188. A spring 666 urges the pawl 662 clockwise into engagement with a stud 667 in the pitman 663.

The engaging mechanism for the No. 4 totalizer, comprising the shaft 665, and engaging cams 667 mounted thereon, having camming slots 668 which cooperate with their respective rollers 669, is similar in every respect to the #1 totalizer engaging mechanism, illustrated in Fig. 13 and described earlier herein.

A link 670 connects the pitman 663 to the cam arm 180 for the actuator segment aliner 184, which, it will be recalled, is rocked clockwise by the roller 178 (Fig. 3) on the arm 56, near the end of the initial movement counter-clockwise of said arm, and after the actuators and their associated segments have completed their initial movements rearwardly.

Clockwise movement of the arm 180, by means of the link 670, rocks the pitman 663 also clockwise to move the upper end of the pawl 662, which is normally out of the path of the stud 661, beneath said stud. After the pawl 662 has been rocked beneath the stud 661, the shaft 665 is rocked counter-clockwise, to engage the wheels of the #4 totalizer with the actuators in add time, which movement causes the crank 664 to shift the pitman 663 upwardly, whereupon the pawl 662 engages the stud 661 and rocks the arm 658 and the shaft 657 counter-clockwise, contrary to the action of the spring 659. Counter-clockwise movement of the shaft 657 (Figs. 6 and 8) and the finger 656, causes said finger, in cooperation with the shoulder 655, to rock the pawl 637 clockwise, against the action of the spring 639, to disengage the ear 646 from the shoulder 647 of the lever 648. This releases the lever 648 to the action of the spring 650, which immediately rocks said lever counter-clockwise causing the cam slot 651, in cooperation with the stud 652, to rock the segment 653 counter-clockwise, to rotate the units wheel 196 one tooth space in a clockwise direction, to add one digit in the consecutive number accumulator. Counter-clockwise movement of the lever 648 is terminated by a projection 671 thereon contacting the shaft 657. When any one of the lower order wheels 196 passes through zero, one of two diametrically opposed projections on a tripping cam 683, integral therewith, trips a pawl, similar to the pawl 637 and said pawl releases a cam lever, similar to the lever 648 which, by means of a sector similar to 653, immediately advances the next higher order wheel 196 one digit.

A restoring bar 672 (Fig. 8) is provided for restoring the tripped levers 648, sectors 653, and pawls 637 to normal positions. The bar 672 is actuated by the totalizer engaging mechanism and functions only after the wheels 196 have been disengaged from their sectors 653 and engaged with the actuator extensions 198. Inasmuch as the consecutive number accumulator is advanced by the finger 656 and is not engaged with the extensions 198 for advancing thereby, the bar 672 receives no movement at this time and therefore the levers 648, sectors 653 and pawls 637 remain in tripped positions until a sub-total or total operation is performed in the No. 3 accumulator, at which time the bar 672 is actuated.

The restoring bar 672 has integral therewith two similar arms 673, only one here shown, fulcrumed on trunnions in the frame 188, said trunnions in axial alinement with the rod 649. At the beginning of sub-total or total operations, in the consecutive number accumulator, the wheels 196 (Fig. 8) are rocked out of engagement with the sectors 653 and into engagement with the actuator extensions 198. Immediately thereafter the restoring bar 672 is rocked clockwise, and in cooperation with the projections 674 of the levers 648, restores said levers and the sectors 653 to normal positions, whereupon the springs 639 restore the pawls 637 counter-clockwise to untripped positions to cause the ears 646 to move into the path of the shoulders 647 in preparation for the next advancing movement of the consecutive number device.

In the present adaptation, a series of operations are necessary to complete one record slip. In the first of said series of operations the consecutive number accumulator is advanced one digit as explained above. Thereafter the consecutive number accumulator is sub-totalized several times to print the consecutive number upon the various portions of the record slip. In the first of these sub-total operations the tripped levers 648, sectors 653 and pawls 637 are restored, by the bar 672, to untripped positions, as explained above.

When the #4 totalizer is selected and conditioned for sub-total or total operations (Figs. 6 and 8) the engaging shaft 665 and the crank 664 are rocked counter-clockwise, at the beginning of machine operation, prior to initial movement clockwise of the arm 180. Consequently the upper end of the pawl 662 moves above the bottom of the stud 661 and upon initial movement of the arm 180 and the pitman 663, said pawl 662 engages said stud 661 and is rocked thereby relatively to said pitman 663, contrary to the action of the spring 666 and obviously without imparting any movement to the arm 658 and the shaft 657. It is therefore evident that when total and sub-total operations are performed in the #4 totalizer the trip pawl 637 (Fig. 8) will not be released, and the units wheel 196, of the consecutive number accumulator, will not be advanced.

After the restoring bar 672 has restored the lever 648, sector 653, and pawl 637, said bar is latched in an intermediate position a slight distance away from the extension 674 and near the end of the operation the latch is disengaged and said bar 672 is spring-returned counter-clockwise to normal position, as here shown. The above action of the restoring bar 672 is necessary for transferring amounts from lower to higher denominations, during adding operations in the regular totalizers, but is unnecessary in this case, where the totalizer has been arranged for the accumulation of a consecutive number and is not actuated by the actuators 133 (Fig. 1).

Summarizing briefly the foregoing description of the consecutive number mechanism, it will be seen that the #3 totalizer is utilized only as a consecutive number accumulator, and that this accumulator is advanced one step each time the #4 totalizer performs an adding operation, but is not advanced when other than adding operations are performed in said #4 totalizer.

Mode of operation

It is believed that an understanding of the mode of operation of the machine embodying the instant invention will have been obtained from a perusal of the foregoing specification. Nevertheless a statement of operation involving a particular business system may be helpful and will now be given. It is not the desire to limit this machine to any particular business or to any particular business system, as the many unique features disclosed herein constitute a machine that is very flexible in nature and one that may with minor alterations and adjustments be adapted for use in connection with many types of businesses and business systems.

In the mode of operation to be described, the machine is used in the preparation of postoffice money orders, such as that shown in Fig. 24, having a main portion 675 known as the "money order proper" and two detachable portions referred to respectively as the "sender's receipt" 676 and the "cashier's slip" 677. A duplicate record of all the entries made during a certain business period, for example, one day, is kept on a journal sheet 678 (Fig. 22), which together with its super-imposed carbon 679 is inserted at the back of the platen roll 177 (Fig. 1) and guided therearound by the table 212, the pressure rollers 209 and a set of auxiliary pressure rollers 680. The journal sheet is divided into a plurality of vertical columns identified by their respective headings, and as previously stated, the journal sheet remains in the machine during a predetermined business period in which a large number of money orders may be issued.

First, the person desiring to send a money order makes out an application blank, a facsimile 681 of which is shown in Fig. 25. On this application blank the sender writes his name and address, the amount of the money order, and the name and address of the person to whom the money order is to be sent. Next the application blank is presented to the issuer, who writes the names and addresses of the sender and receiver in the spaces provided therefor on the money order 675 (Fig. 24) and receipt 676, respectively, and then sees that the traveling carriage 46 (Fig. 18) is in its extreme right-hand or starting position, in which position the projection 271, in cooperation with the slide 580, disables the tappet 487 so that the machine will not operate automatically while typing is being done. With the platen 177 in printing position, as shown in full lines in Fig. 1, the issuer types the name and address of the sender and the name and address of the receiver in their respective columns on the journal sheet 678. After this the traveling carriage is returned to starting position, by depressing the proper return bar, and the platen 177 and front feed guide chute 210 are rocked to front feeding position, as shown in dot and dash lines in Fig. 1.

Next the operator inserts the money order blank, with the names and addresses of the sender and receiver thereon, in the open throat in front of the journal sheet and its carbon, and pushes said blank around the platen 177 into contact with a plurality of stops 682 (Fig. 1) which locate said money order blank in relation to the printing line. Next the issuer or operator inserts the application 681 (Fig. 25) in the open throat, adjacent the cashier's slip 677 (Fig. 24), after which the front feed throat is closed, to return the platen 177 to printing position.

With the traveling carriage 46 (Fig. 18) in its extreme right-hand position, and the tappet 487 disabled, to prevent automatic operation of the machine, the operator types in full the amount "fifty dollars twenty-five cents" on the money order 675, and as there is no carbon paper between the money order and the journal sheet 687, at this point, this typing of the amount is not duplicated upon said journal sheet. After the amount has been typed upon the money order, the operator depresses the typewriter tabulating lever 246, (Figs. 10 and 18) which releases the escapement mechanism and causes the traveling carriage to tabulate until the stopping lug 272, on the slide 273, contacts the projection 271 of the bar 268. This shifts the slide 273 to the right into contact with the block 305, to terminate tabulation of the carriage and to render the tappet 487 effective. Next, by depressing the proper return bar, the operator returns the carriage to the right, to a position where the control block 305, which corresponds to the "amount" column on the money order 675 and journal sheet 687, is in position to control operation of the machine.

The amount of the money order ($50.25) is then set up on the amount keys, and the starting bar 58 (Figs. 1 and 3) is depressed to initiate operation of the machine. During operation of the machine, the amount of the money order is added in the #1 and #4 totalizers, and printed upon the main portion 675 of the money order. In this case the #4 totalizer is used to accumulate a grand total of the amount of the money orders. Also during this cycle of operation the engaging mechanism for the #4 totalizer causes the consecutive number accumulator to be advanced one digit and the mechanism shown in Fig. 10, prevents the amount keys from being released at the end of this operation, so that the amount will be repeated in the next operation. At the end of this operation the machine tabulates automatically to the next column, where the tappet 487 (Fig. 18) and associated mechanism cause an automatic operation of the machine in which the amount ($50.25), is repeat printed upon the receipt 676 (Fig. 24) of the money order.

After this automatic operation the traveling carriage tabulates automatically to the next column and the machine comes to rest. Next the operator sets up the fee (20 cents), charged for issuing the money order, on the amount keys, and depresses the starting bar 58 (Figs. 1 and 3) to initiate operation of the machine, during which the amount of the fee is added in the #1 and #2 totalizers and simultaneously printed upon upon the receipt 676. In this case the #2 totalizer is used to accumulate a grand total of the amount of the fees. At the end of this operation the machine tabulates automatically to the next columnar position, which is an automatic position, and during this automatic operation of the machine the consecutive number or #3 accumulator is automatically sub-totalized and the date printing type carriers are rendered effective to simultaneously print the consecutive number (1235) and the date (January 4, 1938) upon the receipt 676. At the end of this operation the machine tabulates automatically to the next columnar position, which corresponds to the "Total amount" column on the cashier's slip 677 (Fig. 24).

In an automatic operation of the machine the #1 totalizer is totalized, and the total amount of the money order, plus the fee ($50.45) is printed upon the cashier's slip 677. During this operation, the mechanism shown principally in Fig. 21, causes the inking ribbon to be shifted to red printing position so that the total amount ($50.45) will be printed in red. At the end of this operation, the traveling carriage tabulates automatically to the next columnar position and in an automatic operation of the machine, the date (January 4, 1938) and the consecutive number (1235) are printed in their respective columns on the cashier's slip 677.

After the date and consecutive number have been printed upon the cashier's slip, the traveling carriage tabulates automatically to the next columnar position and in an automatic operation of the machine the date and consecutive number are printed upon the application 681 (Fig. 25).

After the date and consecutive number have been printed upon the application the traveling carriage automatically tabulates a slight distance further toward the left, to render the carriage return mechanism effective, which returns said carriage to starting position and when said carriage arrives at starting position the platen roll is automatically rotated to line-space the journal sheet, the money order and the application blank.

Next, just beneath the typed-in amount of the money order, the operator types the name and address of the receiver or payee, after which the typewriter tabulating lever 246 (Fig. 18) is depressed to cause the slide 273, in cooperation with the bar 268, to render the automatic operating tappet 487 effective. Next, the operator depresses the proper return bar to cause the traveling carriage to be returned to a position where the consecutive number accumulator will be selected and conditioned for a sub-total operation and the date printing mechanism rendered effective, after which depressing the auxiliary starting bar 100 (Fig. 3) causes the machine to cycle to print the date and the consecutive number upon the main portion 675 of the money order.

It will be recalled that using the auxiliary starting bar 100, to initiate machine operation, prevents automatic tabulation of the traveling carriage at the end of such operation, and using the auxiliary starting bar also renders mechanism, disclosed in the Christian application No. 653,838 referred to above, effective which causes the platen 177 (Fig. 1) and the guide chute 210 to be moved from printing position, as here shown in full lines to open throat or front-feeding position, as here shown in dot and dash lines, so that the completed money order and the application blank may be readily removed from the machine.

The carbon paper 679 (Fig. 22), which is interposed between the journal sheet 678 and the money order 675, causes the amount, fee, date, consecutive number, and total to be recorded in duplicate in their respective columns on said journal sheet.

When the same sender is purchasing more than one money order, the usual practice is, except in the case of the last one of a series of money orders as will be explained later, to issue money orders, such as that shown in Fig. 23, in which only the main portion and the receipt are completed, no entries being made upon the cashier's slip, which is usually detached from the money order and destroyed.

In this case, prior to beginning preparation of the money orders, the operator shifts the slide 590 (Figs. 2 and 18) downwardly to disable the tappet 488 so that the machine will cease operation after the date and consecutive number have been printed upon the receipt (Fig. 23). After the date and consecutive number have been printed upon the receipt, depressing the proper return bar causes the traveling carriage to be returned to starting position and the platen roll to be automatically rotated to line-space the journal sheet and the money order. The printing of the second line on the money order, shown in Fig. 23, is exactly the same as described for the money order 675 (Fig. 24).

The last of the money orders prepared for this one sender is prepared in exactly the same manner as described for the money order 675 (Fig. 24), and in the "total amount" column of the cashier's slip, the total amount of all the money orders together with their fees is printed herein, and the consecutive number and the date are printed on the cashier's slip and the application blank in exactly the same manner as explained above.

In this latter case, where several money orders are sent by the same person, the amount is omitted from the application blank, as are also the name and address of the receiver or payee.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow:

What is claimed is:

1. In a program control means for a machine of the class described, the combination of power means; a plurality of machine control means, each control means when operated adapted to control certain elements of the machine to perform a certain kind of operation; a normally idle means associated with each control means, each means when operated being connected to a machine control means to select the connected control means for operation; a normally idle mechanism including a plurality of connectors, each connector being associated with a normally idle means and each connector being movable to select an associated normally idle means and an associated control means for actuation; means on the power means to actuate the normally idle mechanism; and control means to move one element of the normally idle mechanism relatively to the power means to enable the power means to actuate the normally idle mechanism and through the latter actuate the selected machine control means.

2. In a program control means for a machine of the class described, the combination of power means; a plurality of machine control means, each control means when operated adapted to control certain elements of the machine to perform a certain kind of operation; a plurality of coupling devices, one associated with each machine control means, said coupling devices being mounted on a common floating support and normally in uncoupled position; a separate means to couple each coupling device to an associated machine control means to select the latter for operation; operating means for the coupling devices mounted on said common support and having an element movable from a normal idle position into a position to be operated by the power means; and control means to move the said element into the position to be operated by the power means, whereby the power means actuates the operating means, the coupling means, and the coupled machine control means to control the operation of the machine.

3. In a program control means for a machine of the class described, the combination of a power means; a function control means operable to cause the machine to perform a certain kind of operation; a coupling hook mounted on a movable support, said hook movable on said support into and out of engagement with the function control means; and an operating means also mounted on said movable support and including a member movable into a position to be actuated by the power means, said power means when actuating the member causing the operating means to move the support to shift the coupling hook in a direction which is different from the direction in which the hook is moved when moved into coupling position to thereby actuate the function control means.

4. In a machine of the class described, the combination of a control means to control certain elements of the machine to cause the machine to perform a certain kind of operation; a pivoted support; a coupling device movably mounted on the pivoted support; means to rock the coupling device in one direction on the support to engage the machine control means; power operated means; normally idle means between the coupling device and the power operated means also movably mounted on the pivoted support; and means to render the idle means active by moving an element of the normally idle means into cooperative relation with the power operated means, said power operated means thereafter adapted to shift the normally idle means in another direction to rock the pivoted support about its pivot to thereby actuate the machine control means.

5. In a machine of the class described, the combination of a control means to control certain elements of the machine to cause the machine to perform a certain kind of operation; a pivoted support; a coupling device movably mounted on the pivoted support; means to rock the coupling device in one direction on the support to engage the machine control means; power operated means; normally idle means between the coupling device and the power operated means also movably mounted on the pivoted support, said idle means including an element movable into cooperative relationship with the power operated means said element having a cam device formed thereon; means coacting with the cam device to normally maintain the element out of cooperative relationship with the power operated means; and means to move the normally idle means on said support to shift the element which through the cam device moves the element into cooperative relationship with the power operated means so that the power operated means through the normally idle means may shift the support and through the support move the coupling device in another direction to operate the control device so that the operated device controls the kind of operation the machine will perform.

6. In a machine of the class described, the combination of a control means to control certain elements of the machine to cause the machine to perform a certain kind of operation; a pivoted support; a coupling device movably mounted on the pivoted support; means to rock the coupling device in one direction on the support to engage the machine control means; power operated means; normally idle means between the coupling device and the power operated means also movably mounted on the pivoted support, said idle means including an element movable into cooperative relationship with the power operated means; a fixed stud on a frame of the machine; a cam slot in the element coacting with the stud to normally maintain the element out of cooperative relationship with the power operated means; and means to shift the normally idle means on said support to thereby move the element and the cam slot relatively to the stud, thereby moving the element into cooperative relationship with the power operated means, whereupon the power operated means can move the element about the stud as a pivot to move the support together with the moved coupling device in another direction to operate the control means.

PAUL H. WILLIAMS.